United States Patent
Pravesh et al.

(10) Patent No.: US 10,703,965 B2
(45) Date of Patent: Jul. 7, 2020

(54) PROPPANT COMPRISING SWELLABLE COATING THEREON FOR TREATMENT OF SUBTERRANEAN FORMATIONS

(71) Applicant: Halliburton Energy Services, Inc., Houston, TX (US)

(72) Inventors: Jag Pravesh, Pune (IN); Rajender Salla, Pune (IN); Philip Nguyen, Houston, TX (US); Vaishali Mishra, Pune (IN); Sunita Kadam, Pune (IN); Rahul Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 141 days.

(21) Appl. No.: 15/744,000

(22) PCT Filed: Sep. 14, 2015

(86) PCT No.: PCT/US2015/049947
§ 371 (c)(1),
(2) Date: Jan. 11, 2018

(87) PCT Pub. No.: WO2017/048222
PCT Pub. Date: Mar. 23, 2017

(65) Prior Publication Data
US 2018/0201828 A1 Jul. 19, 2018

(51) Int. Cl.
*C09K 8/80* (2006.01)
*C09K 8/64* (2006.01)
(Continued)

(52) U.S. Cl.
CPC .......... *C09K 8/805* (2013.01); *C09K 8/64* (2013.01); *C09K 8/66* (2013.01); *C09K 8/82* (2013.01); *C09K 8/84* (2013.01); *E21B 43/267* (2013.01)

(58) Field of Classification Search
CPC ........ E21B 43/26; E21B 43/267; E21B 33/12; E21B 33/138; E21B 47/06; E21B 49/00; E21B 2034/007; E21B 34/10; E21B 43/16; E21B 43/261; E21B 43/263; E21B 33/13; E21B 34/063; E21B 34/14; E21B 41/00; E21B 43/1185; E21B 43/14; E21B 43/25; E21B 47/00; E21B 47/065; E21B 47/10; E21B 47/101; E21B 21/00; E21B 21/066; E21B 23/01; E21B 33/128; E21B 33/129; E21B 33/14; E21B 34/02; E21B 34/08; E21B 43/08; E21B 43/116; E21B 43/117; E21B 43/2405; E21B 43/248; E21B 43/283; E21B 47/09; E21B 49/08; E21B 17/00; E21B 17/023; E21B 17/105; E21B 17/1085; E21B 17/20; E21B 2023/008; E21B 2034/005; E21B 2049/085; E21B 21/062; E21B 23/02; E21B 23/08; E21B 23/14; E21B 27/02; E21B 33/068; E21B 33/1204; E21B 33/1216; E21B 33/127; E21B 33/1285; E21B 33/1295; E21B 33/134; E21B 34/06; E21B 34/12; E21B 34/16; E21B 41/0085; E21B 41/0092; E21B 41/02; E21B 43/00; E21B 43/01; E21B 43/04; E21B 43/11; E21B 43/114; E21B 43/119; E21B 43/12; E21B 43/121; E21B 43/126; E21B 43/128; E21B 43/168; E21B 43/17; E21B 43/255; E21B 43/34; E21B 47/0005; E21B 47/0007; E21B 47/011; E21B 47/0905; E21B 47/091; E21B 47/102; E21B 47/1025; E21B 47/12; E21B 47/123; E21B 47/124; E21B 47/18; E21B 49/082; E21B 49/087; E21B 49/10; E21B 4/006; E21B 4/04; E21B 4/18; E21B 7/04; C09K 8/80; C09K 8/805; C09K 8/68; C09K 8/665; C09K 8/62; C09K 8/035; C09K 8/46; C09K 8/506; C09K 8/72; C09K 8/887; C09K 2208/10; C09K 2208/26; C09K 2208/30; C09K 2208/32; C09K 8/42; C09K 8/428; C09K 8/5045; C09K 8/52; C09K 8/54; C09K 8/588; C09K 8/64; C09K 8/685; C09K 8/703; C09K 8/706; C09K 8/86;
(Continued)

(56) References Cited

U.S. PATENT DOCUMENTS

| 2007/0161515 A1* | 7/2007 | Bicerano | C09K 8/68 507/117 |
| 2013/0233545 A1* | 9/2013 | Mahoney | C09K 8/805 166/280.2 |

(Continued)

FOREIGN PATENT DOCUMENTS

WO 2015047301 4/2015

OTHER PUBLICATIONS

International Search Report and Written Opinion of PcT Application No. PCT/US2015/049947 dated Oct. 21, 2016: pp. 1-15.
Mahoney et al., SPE 163818: "Self-Suspending Proppant," SPE International, 2013: pp. 1-14.
(Continued)

*Primary Examiner* — Kumar R Bhushan
(74) *Attorney, Agent, or Firm* — Chamberlain Hrdlicka

(57) ABSTRACT

Various embodiments disclosed relate to proppant including a swellable coating thereon for treatment of subterranean formations. In various embodiments, the present invention provides a method of treating a subterranean formation. The method includes placing in the subterranean formation a proppant including a coating thereon. The coating is swellable with aqueous medium in response to a trigger including acidic pH, $CO_2$, $H_2S$, or a combination thereof.

4 Claims, 4 Drawing Sheets

(51) Int. Cl.
*C09K 8/66* (2006.01)
*C09K 8/84* (2006.01)
*C09K 8/82* (2006.01)
*E21B 43/267* (2006.01)

(58) Field of Classification Search
CPC ...... C09K 8/882; C09K 8/90; C09K 2208/04; C09K 2208/08; C09K 2208/28; C09K 8/06; C09K 8/08; C09K 8/36; C09K 8/40; C09K 8/424; C09K 8/44; C09K 8/467; C09K 8/48; C09K 8/487; C09K 8/5086; C09K 8/512; C09K 8/518; C09K 8/524; C09K 8/528; C09K 8/572; C09K 8/5755; C09K 8/58; C09K 8/584; C09K 8/604; C09K 8/66; C09K 8/70; C09K 8/74; C09K 8/76; C09K 8/845; C09K 8/88; C09K 8/94
See application file for complete search history.

(56) References Cited

U.S. PATENT DOCUMENTS

| | | |
|---|---|---|
| 2014/0060827 A1 | 3/2014 | Nguyen et al. |
| 2014/0090844 A1 | 4/2014 | Daou et al. |
| 2015/0129213 A1 | 5/2015 | Szabo et al. |
| 2015/0252253 A1 | 9/2015 | Soane et al. |
| 2016/0102243 A1* | 4/2016 | Abasiattai ............ C09K 8/80 166/308.1 |
| 2016/0333258 A1* | 11/2016 | Drake .................. C09K 8/805 |

OTHER PUBLICATIONS

Maley et al., IPTC-17806-MS: Surface Modification of Proppant to Improve Transport and Placement,: IPTC International Petroleum Technology Conference, 2014: p. 1-17.

Anonymous, "Proppant Transport Technology," Fairmont Santrol Proppant Solutions, retrieved Jan. 11, 2018: pp. 1-2, <http://propelssp.com/>.

* cited by examiner

PROPPANT COMPRISING SWELLABLE COATING THEREON FOR TREATMENT OF SUBTERRANEAN FORMATIONS

BACKGROUND

Proppants are typically suspended in fracturing fluids by using fluids having increased viscosity, such as via use of linear or crosslinked gels, such as guar or polysaccharides. Fracturing of unconventional low permeability subterranean formations is often performed using low viscosity friction-reduced waters (e.g., containing polyacrylamide), which are unsuitable for efficient suspension of proppants, resulting in improper proppant placement, early screen-out, and un-propped fractures.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
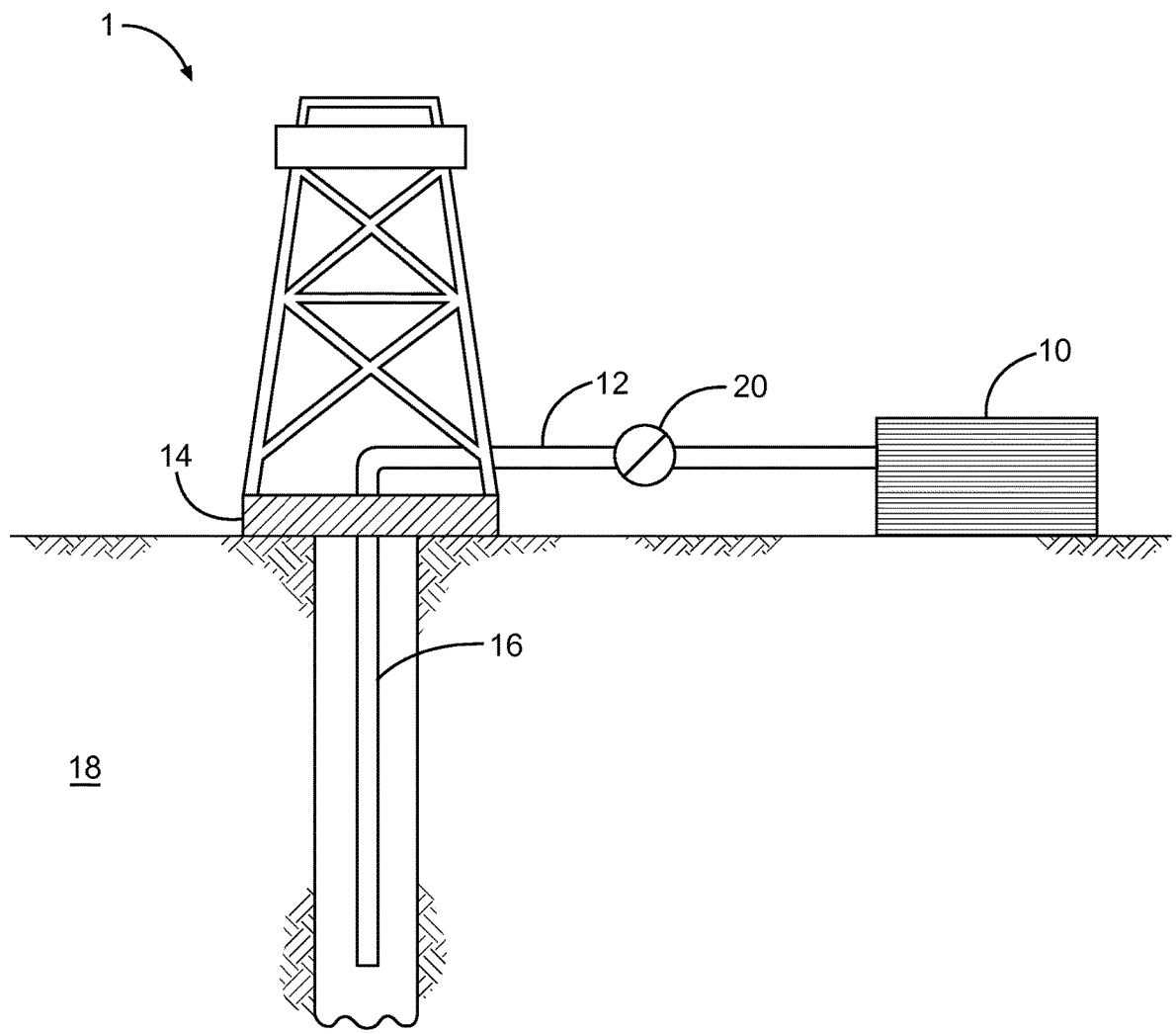
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO₂R, SO₂N(R)₂, SO₃R, C(O)R, C(O)C(O)R, C(O)CH₂C(O)R, C(S)R, C(O)OR, OC(O)R, C(O)N(R)₂, OC(O)N(R)₂, C(S)N(R)₂, (CH₂)₀₋₂N(R)C(O)R, (CH₂)₀₋₂N(R)N(R)₂, N(R)N(R)C(O)R, N(R)N(R)C(O)OR, N(R)N(R)CON(R)₂, N(R)SO₂R, N(R)SO₂N(R)₂, N(R)C(O)OR, N(R)C(O)R, N(R)C(S)R, N(R)C(O)N(R)₂, N(R)C(S)N(R)₂, N(COR)COR, N(OR)R, C(=NH)N(R)₂, C(O)N(OR)R, and C(=NOR)R, wherein R can be hydrogen or a carbon-based moiety; for example, R can be hydrogen, ($C_1$-$C_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH₃), —CH=C(CH₃)₂, —C(CH₃)=CH₂, —C(CH₃)=CH(CH₃), —C(CH₂CH₃)=CH₂, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as ($C_a$-$C_b$)hydrocarbyl, wherein a and b are positive integers and mean having any of a to b number of carbon atoms. For example, $(C_1-C_4)$hydrocarbyl means the hydrocarbyl group can be methyl $(C_1)$, ethyl $(C_2)$, propyl $(C_3)$, or butyl $(C_4)$, and $(C_0-C_b)$hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "fracturing fluid" refers to fluids or slurries used downhole during fracturing operations.

As used herein, the term "remedial treatment fluid" refers to fluids or slurries used downhole for remedial treatment of a well, and can also be called a "work-over fluid." Remedial treatments, also called work-over treatments, can include treatments designed to increase or maintain the production rate of a well, such as stimulation or clean-up treatments.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including stimulation, hydraulic fracturing, remedial treatment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2-C_{40}$ fatty acid $C_1-C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

The polymers described herein can independently terminate in any suitable way. In some embodiments, the polymers can independently terminate with an end group that is independently chosen from a suitable polymerization initiator, —H, —OH, a substituted or unsubstituted ($C_1$-$C_{20}$) hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly (substituted or unsubstituted ($C_1$-$C_{20}$)hydrocarbyloxy), and a poly(substituted or unsubstituted ($C_1$-$C_{20}$)hydrocarbylamino). The polymers can independently have the same or different terminal groups.

In various embodiments, the present invention provides a method of treating a subterranean formation. The method includes placing in the subterranean formation a proppant including a coating thereon. The coating is swellable with aqueous medium in response to a trigger including acidic pH, $CO_2$, $H_2S$, or a combination thereof.

In various embodiments, the present invention provides a method of treating a subterranean formation. The method includes placing in the subterranean formation a proppant including a coating thereon. The coating is swellable with aqueous medium in response to a trigger including acidic pH, $CO_2$, $H_2S$, or a combination thereof. The coating includes a polymer including repeating groups having the structure:

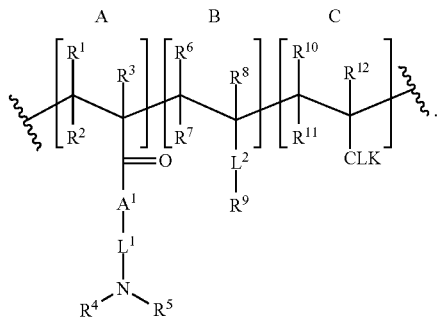

Repeating groups A, B, and C have a random or block copolymer arrangement and are in the order shown or any other order. At each occurrence, repeating groups A, B, and C independently occur in the direction shown or in the opposite direction. Repeating group A is about 50 mol % to about 98.999 mol % of the polymer. Repeating group B is about 1 mol % to about 50 mol % of the polymer. Repeating group C is about 0.001 mol % to about 20 mol % of the polymer. The variable $A^1$ is selected from the group consisting of —O— and —NH—. The variables $R^1$, $R^2$, $R^3$, $R^4$, and $R^5$ are each independently selected from the group consisting of —H, halide, and substituted or unsubstituted ($C_1$-$C_{50}$)hydrocarbyl interrupted by 0, 1, 2, or 3 groups independently selected from —O—, —S—, substituted or unsubstituted —NH—, —($CH_2$—$CH_2$—O)$_{n1}$—, and —($CH_2$—$CH_2$—$CH_2$—O)$_{n1}$—, wherein n1 is about 1 to about 10,000. The variable $L^1$ is substituted or unsubstituted ($C_1$-$C_{50}$)hydrocarbylene interrupted by 0, 1, 2, or 3 groups independently selected from —O—, —S—, substituted or unsubstituted —NH—, —($CH_2$—$CH_2$—O)$_{n2}$—, and —($CH_2$—$CH_2$—$CH_2$—O)$_{n2}$—, wherein n2 is about 1 to about 10,000. The variables $R^6$, $R^7$, $R^8$ are each independently selected from the group consisting of —H, halide, and substituted or unsubstituted ($C_1$-$C_{50}$)hydrocarbyl interrupted by 0, 1, 2, or 3 groups independently selected from —O—, —S—, substituted or unsubstituted —NH—, —($CH_2$—$CH_2$—O)$_{n3}$—, and —($CH_2$—$CH_2$—$CH_2$—O)$_{n3}$—, wherein n3 is about 1 to about 10,000. The variable $L^2$ is selected from the group consisting of a bond and substituted or unsubstituted ($C_1$-$C_{50}$)hydrocarbylene interrupted by 0, 1, 2, or 3 groups independently selected from —O—, —S—, substituted or unsubstituted —NH—, —($CH_2$—$CH_2$—O)$_{n4}$—, and —($CH_2$—$CH_2$—$CH_2$—O)$_{n4}$—, wherein n4 is about 1 to about 10,000. The variable $R^9$ is selected from the group consisting of substituted ($C_1$-$C_{20}$)aryl and substituted or unsubstituted ($C_1$-$C_{20}$) heteroaryl. The variables $R^{10}$, $R^{11}$, and $R^{12}$ are each independently selected from the group consisting of —H, halide, and substituted or unsubstituted ($C_1$-$C_{50}$)hydrocarbyl interrupted by 0, 1, 2, or 3 groups independently selected from —O—, —S—, substituted or unsubstituted —NH—, —($CH_2$—$CH_2$—O)$_{n5}$—, and —($CH_2$—$CH_2$—$CH_2$—O)$_{n5}$—, wherein n5 is about 1 to about 10,000. The variable CLK is at least one of an intermolecular and an intramolecular crosslink including a substituted or unsubstituted ($C_1$-$C_{50}$)hydrocarbylene interrupted by 0, 1, 2, or 3 groups independently selected from —O—, —S—, substituted or unsubstituted —NH—, —($CH_2$—$CH_2$—O)$_{n6}$—, and —($CH_2$—$CH_2$—$CH_2$—O)$_{n6}$—, wherein n6 is about 1 to about 10,000.

In various embodiments, the present invention provides a system. The system includes a tubular disposed in a subterranean formation. The system also includes a pump configured to pump a composition including a proppant including a coating thereon in the subterranean formation through the tubular. The coating is swellable with aqueous medium in response to a trigger including acidic pH, $CO_2$, $H_2S$, or a combination thereof.

In various embodiments, the present invention provides a proppant for treatment of a subterranean formation. The proppant includes a coating thereon. The coating is swellable with aqueous medium in response to a trigger including acidic pH, $CO_2$, $H_2S$, or a combination thereof.

In various embodiments, the present invention provides a proppant for treatment of a subterranean formation. The proppant includes a coating thereon. The coating is swellable with aqueous medium in response to a trigger including acidic pH, CO$_2$, H$_2$S, or a combination thereof. The coating includes a polymer including repeating groups having the structure:

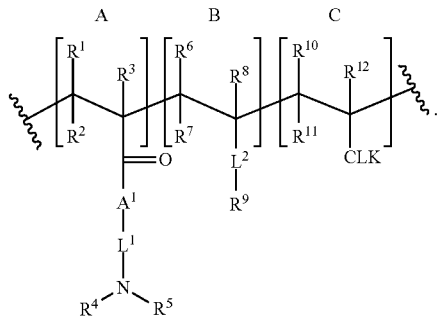

Repeating groups A, B, and C have a random or block copolymer arrangement and are in the order shown or any other order. At each occurrence, repeating groups A, B, and C independently occur in the direction shown or in the opposite direction. Repeating group A is about 50 mol % to about 98.999 mol % of the polymer. Repeating group B is about 1 mol % to about 50 mol % of the polymer. Repeating group C is about 0.001 mol % to about 20 mol % of the polymer. The variable A$^1$ is selected from the group consisting of —O— and —NH—. The variables R$^1$, R$^2$, R$^3$, R$^4$, and R$^5$ are each independently selected from the group consisting of —H, halide, and substituted or unsubstituted (C$_1$-C$_{50}$)hydrocarbyl interrupted by 0, 1, 2, or 3 groups independently selected from —O—, —S—, substituted or unsubstituted —NH—, —(CH$_2$—CH$_2$—O)$_{n1}$—, and —(CH$_2$—CH$_2$—CH$_2$—O)$_{n1}$—, wherein n1 is about 1 to about 10,000. The variable L$^1$ is substituted or unsubstituted (C$_1$-C$_{50}$)hydrocarbylene interrupted by 0, 1, 2, or 3 groups independently selected from —O—, —S—, substituted or unsubstituted —NH—, —(CH$_2$—CH$_2$—O)$_{n2}$—, and —(CH$_2$—CH$_2$—CH$_2$—O)$_{n2}$—, wherein n2 is about 1 to about 10,000. The variables R$^6$, R$^7$, R$^8$ are each independently selected from the group consisting of —H, halide, and substituted or unsubstituted (C$_1$-C$_{50}$)hydrocarbyl interrupted by 0, 1, 2, or 3 groups independently selected from —O—, —S—, substituted or unsubstituted —NH—, —(CH$_2$—CH$_2$—O)$_{n3}$—, and —(CH$_2$—CH$_2$—CH$_2$—O)$_{n3}$—, wherein n3 is about 1 to about 10,000. The variable L$^2$ is selected from the group consisting of a bond and substituted or unsubstituted (C$_1$-C$_{50}$)hydrocarbylene interrupted by 0, 1, 2, or 3 groups independently selected from —O—, —S—, substituted or unsubstituted —NH—, —(CH$_2$—CH$_2$—O)$_{n4}$—, and —(CH$_2$—CH$_2$—CH$_2$—O)$_{n4}$—, wherein n4 is about 1 to about 10,000. The variable R$^9$ is selected from the group consisting of substituted (C$_1$-C$_{20}$)aryl and substituted or unsubstituted (C$_1$-C$_{20}$) heteroaryl. The variables R$^{10}$, R$^{11}$, and R$^{12}$ are each independently selected from the group consisting of —H, halide, and substituted or unsubstituted (C$_1$-C$_{50}$)hydrocarbyl interrupted by 0, 1, 2, or 3 groups independently selected from —O—, —S—, substituted or unsubstituted —NH—, —(CH$_2$—CH$_2$—O)$_{n5}$—, and —(CH$_2$—CH$_2$—CH$_2$—O)$_{n5}$—, wherein n5 is about 1 to about 10,000. The variable CLK is at least one of an intermolecular and an intramolecular crosslink including a substituted or unsubstituted (C$_1$-C$_{50}$)hydrocarbylene interrupted by 0, 1, 2, or 3 groups independently selected from —O—, —S—, substituted or unsubstituted —NH—, —(CH$_2$—CH$_2$—O)$_{n6}$—, and —(CH$_2$—CH$_2$—CH$_2$—O)$_{n6}$—, wherein n6 is about 1 to about 10,000.

In various embodiments, the present invention provides a method of preparing a proppant for treatment of a subterranean formation. The method includes coating a proppant with a coating that is swellable with aqueous medium in response to a trigger including acidic pH, CO$_2$, H$_2$S, or a combination thereof.

In various embodiments, the coated proppant provides certain advantages over other proppants, at least some of which are unexpected. For example, in various embodiments, the coated proppant can have improved transport properties in unviscosified or low viscosity fluids. In various embodiments, when the coating is swollen with aqueous media, the coated proppant can have increased buoyancy, such that the coated proppant can self-suspend in the aqueous media without the aid of flowing media or external viscosifiers. In some embodiments, the coated proppant with a swollen coating can self-suspend in a friction-reduced fluid. The suspension properties of the swollen coated proppant can help to avoid premature screen-out and un-propped fractures.

In various embodiments, the coated proppant can remain substantially unswollen in aqueous medium until subjected to triggering conditions, such as acidic pH, CO$_2$, H$_2$S, or a combination thereof. In high pH conditions (e.g., basic pH), the coated proppant can be triggered to swell upon exposure to CO$_2$ or H$_2$S.

In various embodiments, if the subterranean formation includes acidic conditions, CO$_2$, or H$_2$S, the coated proppant can be triggered to swell upon encountering these conditions. The subterranean formation can naturally include the triggering conditions, or materials can be placed in the subterranean formation to generate triggering conditions.

In various embodiments, the coated proppant can be stable even at high temperatures, such as up to 204° C., which can allow the coated proppant to remain suspended for long periods even under high temperature conditions.

In various embodiments, the coating of the coated proppant can be efficiently broken down by the use of breakers such as standard oxidative breakers, leaving little to no polymeric residue behind. In various embodiments, the coating of the coated proppant can return to an unswollen state upon the application of neutral or basic pH.

In various embodiments, the coating on the coated proppant can be formed using inexpensive starting materials. In various embodiments, the coated proppant can be easily and inexpensively generated.

In various embodiments, the coated proppant can enhance the vertical distribution of proppant packing in the fracture. In various embodiments, the coated proppant can enhance the transport of proppant deep inside the created fracture. Using conventional proppant, proppant screen-out can occur, which can result in shutting down the fracturing treatment or can result in incomplete placement of the designated quantity of proppant. In various embodiments, the coated proppant can reduce or minimize build-up of proppant pack near the wellbore (e.g., near perforations in the wellbore) and thus can reduce or minimize potential of proppant screen-out.

In various embodiments, the swellable coating can have scale inhibiting properties, such as via phosphonic acid functionalities in the polymer in the coating. In various embodiments, the coating includes scale inhibitors or corrosion inhibitors that are compatible with the polymer in the coating, such as trapped in a crosslinked polymer network of the coating, which can provide scale inhibition and corrosion inhibition during use of the proppant. In various embodiments, scale inhibition or corrosion inhibition can occur before, during, or after breaking down the coating of the proppant.

Method of Treating a Subterranean Formation.

In some embodiments, the present invention provides a method of treating a subterranean formation. The method includes placing in the subterranean formation a proppant including a coating thereon. In some embodiments, the proppant is included in a composition, and placing the proppant in the subterranean formation includes placing the composition including the proppant in the subterranean formation.

The placing of the coated proppant or composition including the same in the subterranean formation can include contacting the coated proppant or composition including the same and any suitable part of the subterranean formation, or contacting the coated proppant or composition including the same and a subterranean material, such as any suitable subterranean material. The subterranean formation can be any suitable subterranean formation. In some examples, the placing of the coated proppant or composition including the same in the subterranean formation includes contacting the coated proppant or composition including the same with or placing the coated proppant or composition including the same in at least one of a fracture, at least a part of an area surrounding a fracture, a flow pathway, an area surrounding a flow pathway, and an area desired to be fractured. The placing of the coated proppant or composition including the same in the subterranean formation can be any suitable placing and can include any suitable contacting between the subterranean formation and the coated proppant or composition including the same. The placing of the composition in the subterranean formation can include at least partially depositing the coated proppant or composition including the same in a fracture, flow pathway, or area surrounding the same.

In some embodiments, the method includes obtaining or providing the composition including proppant. The obtaining or providing of the composition can occur at any suitable time and at any suitable location. The obtaining or providing of the composition can occur above the surface (e.g., the proppant or other components of the composition can be combined above-surface). The obtaining or providing of the composition can occur in the subterranean formation (e.g., the proppant or other components of the composition can be combined downhole).

The method can include hydraulic fracturing, such as a method of hydraulic fracturing to generate a fracture or flow pathway. The composition including the coated proppant can include or can be a fracturing fluid, such as a fracturing fluid including viscosifiers (e.g., linear or crosslinked gel), a fracturing fluid free of viscosifiers (e.g., substantially free of linear gel or crosslinked gel, or substantially free of viscosifying polysaccharides), or a fracturing fluid free of viscosifiers and further including friction reducers. The composition including the coated proppant can be a fracturing fluid for fracturing low permeability formations. The placing of the proppant or composition including the same in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during a slurry stage of the fracturing (e.g., viscous fluid with proppant). The method can include performing a stimulation treatment at least one of before, during, and after placing the proppant or composition including the same in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the proppant or composition including the same is placed in or contacted to, or the proppant or composition including the same is placed in or contacted to an area surrounding the generated fracture or flow pathway. In some embodiments, the method can be a method of stimulation, fracturing, remedial treatment, or a combination thereof.

The proppant of the coated proppant can be any suitable proppant. The composition can include one type of coated proppant, or multiple types of coated proppant. A proppant is a material that keeps an induced hydraulic fracture at least partially open during or after a fracturing treatment. The coated proppant can be transported into the subterranean formation (e.g., downhole) to the fracture using fluid, such as fracturing fluid or another fluid. The proppant can be sand, gravel, glass beads, metal beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant (e.g., excluding the coating) can have an average particle size, wherein particle size is the largest dimension of a particle, of about 0.001 mm to about 5 mm, about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition including coated proppant can include any suitable amount of coated proppant, such as about 0.001 wt % to about 99.99 wt %, about 95 wt % to about 99 wt %, about 0.01 wt % to about 50 wt %, about 0.1 wt % to about 80 wt %, about 10 wt % to about 60 wt %, or about 0.01 wt % or less, or less than, equal to, or more than about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

The coating can cover any suitable proportion of the surface area of the proppant. The coating can cover about 1% to about 100% of the surface area of the proppant, or about 1% or less, or less than, equal to, or more than about 5%, 10, 15, 20, 25, 30, 35, 40, 45, 50, 55, 60, 65, 70, 75, 80, 82, 84, 86, 88, 90, 92, 94, 96, 97, 98, 99, 99.9, 99.99, or about 99.999% or more. The coating can have any suitable thickness. For example, in a substantially unswelled state (e.g., after synthesis and prior to exposure to acidic pH, $CO_2$, or $H_2S$), the coating can have a thickness of about 1 μm to about 5 mm, about 10 μm to about 2 mm, or about 1 μm or less, or about 2 μm, 4, 6, 8, 10, 15, 20, 25, 30, 40, 50, 60, 70, 80, 90, 100, 120, 140, 160, 180, 200, 225, 250, 300, 350, 400, 450, 500, 600, 700, 800, 900 μm, 1 mm, 1.2, 1.4, 1.6, 1.8, 2, 2.2, 2.4, 2.6, 2.8, 3, 3.5, 4, 4.5, or about 5 mm or more. The proppant including the coating, while the coating is in a substantially unswelled state, can have a particle size of about 1 µm to about 15 mm, or about 1 µm or less, or about 2 µm, 4, 6, 8, 10, 15, 20, 25, 30, 40, 50, 60, 70, 80, 90, 100, 120, 140, 160, 180, 200, 225, 250, 300, 350, 400, 450, 500, 600, 700, 800, 900 µm, 1 mm, 1.2, 1.4, 1.6, 1.8, 2, 2.2, 2.4, 2.6, 2.8, 3, 3.5, 4, 4.5, 5, 6, 7, 8, 9, 10, 11, 12, 13, 14, or about 15 mm or more. The coating can be any suitable proportion of the coated proppant. For example, in a substantially unswelled state, the coating can be about 0.001 wt % to about 99.999 wt %, or about 0.001 wt % to about 50 wt %, or about 0.01 wt % to about 10 wt %, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more. The proppant can be any suitable proportion of the coated proppant. For example, in a substantially unswelled state, the proppant can be about 0.001 wt % to about 99.999 wt %, or about 50 wt % to about 99.999 wt %, or about 90 wt % to about 99.999 wt %, or less than about 0.001 wt %, or less than, equal to, or more than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more.

The coating on the coated proppant is swellable with aqueous medium in response to a trigger including acidic pH, $CO_2$, $H_2S$, or a combination thereof. The method can include triggering the swelling of the coating on the proppant. For example, the coating can be substantially unswollen, and the method can include triggering swelling of the coating on the proppant by exposing to aqueous medium, the triggering including exposing the coating to acidic pH, $CO_2$, $H_2S$, or a combination thereof. The triggering can occur above-surface, in the subterranean formation, or a combination thereof. The triggering can include modifying the pH of the ambient environment of the coated proppant, adding $CO_2$ to the ambient environment of the coated proppant, adding $H_2S$ to the ambient environment of the coated proppant, or a combination thereof. The triggering can include placing the coated proppant in an ambient environment that includes an acidic pH, $CO_2$, $H_2S$, or a combination thereof. After the triggering and the swelling, the coated proppant has a greater buoyancy due to the greater proportion of aqueous media in the coated proppant. At the time of placing the coated proppant in the subterranean formation, the coating can be substantially unswollen. In some embodiments, at the time of placing the coated proppant in the subterranean formation, the coating can be partially swollen or fully swollen. Without exposure to triggering conditions, the coated particle can remain in a substantially unswollen state for any suitable time before swelling begins, such as for about 0.1 h to about 1 week, 0.1 h to about 5 h, 0.5 h to about 1 h, or about 0.1 h or less, or less than, equal to, or more than about 0.2 h, 0.3, 0.4, 0.5, 0.6, 0.7, 0.8, 0.9, 1, 1.2, 1.4, 1.6, 1.8, 2, 2.2, 2.4, 2.6, 2.8, 3, 3.5, 4, 4.5, 5, 6, 8, 10, 15, 20 h, 1 day, 1.5, 2, 3, 4, 5, 6, or about 7 days or more.

As used herein, "in a substantially unswelled state" refers to the coating in an after-synthesized and pre-swollen state, prior to being exposed to triggering conditions, such as including about 0 wt % of aqueous medium, or about 0 wt % to about 50 wt %, or less than, equal to, or more than about 0.001 wt %, 0.01, 0.1, 1, 2, 3, 4, 5, 6, 7, 8, 9, 10, 15, 20, 25, 30, 35, 40, 45, or about 50 wt % or more. When the coating has been fully swollen with aqueous media, the coating can include any suitable wt % of aqueous media, such as about 50 wt % to about 100,000 wt %, or about 50 wt % or less, or less than, equal to, or more than about 60 wt %, 80, 100, 120, 140, 160, 180, 200, 250, 300, 350, 400, 450, 500, 600, 700, 800, 900, 1,000, 1,500, 2,000, 2,500, 5,000, 10,000, 15,000, 20,000, 25,000, 50,000, 75,000, or about 100,000% or more. When the coating has been fully swollen with aqueous media, the swollen coating can have any suitable thickness, such as about 1 µm to about 20 mm, about 5 µm to about 10 mm, or about 1 µm or less, or about 2 µm, 4, 6, 8, 10, 15, 20, 25, 30, 40, 50, 60, 70, 80, 90, 100, 120, 140, 160, 180, 200, 225, 250, 300, 350, 400, 450, 500, 600, 700, 800, 900 µm, 1 mm, 1.2, 1.4, 1.6, 1.8, 2, 2.2, 2.4, 2.6, 2.8, 3, 3.5, 4, 4.5, 5, 6, 7, 8, 9, 10, 11, 12, 13, 14, 15, 16, 17, 18, 19, or about 20 mm or more. The average particle size of a fully swollen coated proppant can be about 1 µm to about 40 mm, about 5 µm to about 20 mm, or about 1 µm or less, or about 2 µm, 4, 6, 8, 10, 15, 20, 25, 30, 40, 50, 60, 70, 80, 90, 100, 120, 140, 160, 180, 200, 225, 250, 300, 350, 400, 450, 500, 600, 700, 800, 900 µm, 1 mm, 1.2, 1.4, 1.6, 1.8, 2, 2.2, 2.4, 2.6, 2.8, 3, 3.5, 4, 4.5, 5, 6, 7, 8, 9, 10, 11, 12, 13, 14, 15, 16, 17, 18, 19, 20, 22, 24, 26, 28, 30, 32, 34, 36, 38, or about 40 mm or more.

The composition including the proppant can include water (e.g., the aqueous media that the coated proppant absorbs and swells with). The water can be any suitable water, such as fresh water or salt water (e.g., produced water, flowback water, brackish water, sea water, or a combination thereof). The salt in the salt water can be any suitable one or more salts, such as at least one of NaBr, $CaCl_2$, $CaBr_2$, $ZnBr_2$, KCl, NaCl, a magnesium salt, a bromide salt, a formate salt, an acetate salt, and a nitrate salt. The aqueous media can have any suitable total dissolved solids level (e.g., wherein the dissolved solids correspond to dissolved salts), such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The aqueous media can have any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250,000, 275,000, or about 300,000 ppm or more. In some examples, the aqueous media can have a concentration of at least one of NaBr, $CaCl_2$, $CaBr_2$, $ZnBr_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more. The aqueous media can form any suitable proportion of the composition including the coated proppant, such as about 0.001 wt % to about 99.999 wt % of the composition, or about 0.001 wt % or less, or less than, equal to, or more than about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, 99, 99.9, 99.99, or about 99.999 wt % or more.

In various embodiments, the method can include breaking down the coating on the polymer, such as by using high pH, or such as by using one or more breakers. In some embodiments, the composition or a mixture including the same can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition including the coated proppant or a mixture including the composition, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more. In some embodiments, the composition including the proppant is free of breakers.

In some embodiments, the method can include deswelling the coating on the proppant, such as by exposing the coated proppant to basic or neutral conditions. In some examples, a coated proppant swollen as a result of exposure to $CO_2$ can be deswollen by treating with basic or neutral conditions. After the deswelling, the coated particle can have any suitable size. For example, the deswollen coated particle can have a particle size that is about 100% to about 10,000% of the size of the coated particle in a substantially unswollen state, or about 101% to about 1,000%, or about 100% or less, or less than, equal to, or more than about 101%, 102, 103, 104, 105, 106, 108, 110, 115, 120, 130, 140, 150, 175, 200, 250, 300, 350, 400, 450, 500, 600, 700, 800, 900, 1,000, 5,000, or about 10,000% or more.

Polymer.

The coating on the proppant can include a polymer that includes a repeating group having the structure:

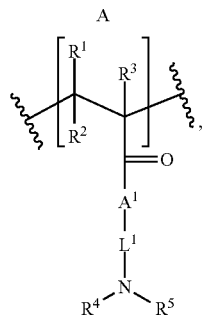

The coating can include one polymer including repeating group A or more than one polymer including repeating group A. The variable $A^1$ can be selected from the group consisting of —O— and —NH—. The variable $A^1$ can be —O—. The variables $R^1$, $R^2$, $R^3$, $R^4$, and $R^5$ can each be independently selected from the group consisting of —H, halide, and substituted or unsubstituted ($C_1$-$C_{50}$)hydrocarbyl interrupted by 0, 1, 2, or 3 groups independently selected from —O—, —S—, substituted or unsubstituted —NH—, —($CH_2$—$CH_2$—O)$_{n1}$—, and —($CH_2$—$CH_2$—$CH_2$—O)$_{n1}$—, wherein n1 is about 1 to about 10,000 (e.g., about 1 to about 100, or about 1 to about 10, or about 1, 2, 3, 4, 5, 6, 7, 8, 9, 10, 12, 14, 16, 18, 20, 25, 30, 35, 40, 45, 50, 75, 100, 125, 150, 175, 200, 250, 300, 400, 500, 750, 1,000, 1,500, 2,000, 2,500, 5,000, 7,500, or about 10,000 or more). The variables $R^1$, $R^2$, $R^3$, $R^4$, and $R^5$ can each be independently selected from the group consisting of —H and ($C_1$-$C_{20}$)hydrocarbyl. The variables $R^1$, $R^2$, $R^3$, $R^4$, and $R^5$ can each be independently selected from the group consisting of —H and ($C_1$-$C_{10}$)alkyl. The variables $R^1$ and $R^2$ can be —H, and $R^3$, $R^4$, and $R^5$ can be methyl. $L^1$ is substituted or unsubstituted ($C_1$-$C_{50}$)hydrocarbylene interrupted by 0, 1, 2, or 3 groups independently selected from —O—, —S—, substituted or unsubstituted —NH—, —($CH_2$—$CH_2$—O)$_{n2}$—, and —($CH_2$—$CH_2$—$CH_2$—O)$_{n2}$—, wherein n2 is about 1 to about 10,000 (e.g., about 1 to about 100, or about 1 to about 10, or about 1, 2, 3, 4, 5, 6, 7, 8, 9, 10, 12, 14, 16, 18, 20, 25, 30, 35, 40, 45, 50, 75, 100, 125, 150, 175, 200, 250, 300, 400, 500, 750, 1,000, 1,500, 2,000, 2,500, 5,000, 7,500, or about 10,000 or more). The variable $L^1$ can be ($C_1$-$C_{20}$)hydrocarbylene. The variable $L^1$ can be ($C_1$-$C_{10}$) alkylene. The variable $L^1$ can be ethylene. Repeating group A can have the structure:

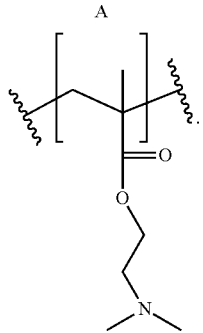

The polymer including repeating group A can be any suitable proportion of the polymer including repeating group A, such as about 10 mol % to about 100 mol %, about 60 mol % to about 95 mol %, or about 10 mol % or less, or less than, equal to, or more than about 15 mol %, 20, 25, 30, 35, 40, 45, 50, 55, 60, 62, 64, 66, 68, 70, 72, 74, 76, 78, 80, 82, 84, 86, 88, 90, 92, 94, 95, 96, 97, 98, 99, 99.9, 99.99, or about 99.999 mol % or more.

The polymer including repeating group A can be any suitable proportion of the coating of the proppant. In some embodiments, the polymer including repeating group A is about 100 wt % of non-solvent components of the coating, or about 10 wt % to about 100 wt %, about 80 wt % to 100 wt %, or about 10 wt % or less, or less than, equal to, or more than 15 wt %, 20, 25, 30, 35, 40, 45, 50, 55, 60, 65, 70, 75, 80, 82, 84, 86, 88, 90, 92, 94, 95, 96, 97, 98, 99, 99.9, 99.99, or about 99.999 wt % or more. In some embodiments, the polymer including repeating group A can be about 10 wt % to about 100 wt % of the coating in a substantially unswollen state (e.g., after synthesis, but before exposure to triggering conditions), about 80 wt % to about 100 wt %, or about 10 wt % or less, or less than, equal to, or more than 15 wt %, 20, 25, 30, 35, 40, 45, 50, 55, 60, 65, 70, 75, 80, 82, 84, 86, 88, 90, 92, 94, 95, 96, 97, 98, 99, 99.9, 99.99, or about 99.999 wt % or more.

The polymer including repeating group A (e.g., not considering inter-polymer crosslinks) can have any suitable molecular weight, such as about 100 g/mol to about 20,000, 000 g/mol, or about 1,000 g/mol to about 1,000,000 g/mol, or about 100 g/mol or less, or less than, equal to, or more than about 200 g/mol, 300, 500, 750, 1,000, 1,500, 2,000, 2,500, 5,000, 10,000, 15,000, 20,000, 25,000, 50,000, 75,000, 100,000, 150,000, 200,000, 250,000, 500,000, 1,000,000, 2,000,000, 5,000,000, 10,000,000, 15,000,000, or about 20,000,000 g/mol or more.

The polymer can further include a repeating group having the structure:

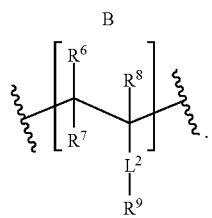

The variables $R^6$, $R^7$, $R^8$ can each be independently selected from the group consisting of —H, halide, and substituted or unsubstituted $(C_1-C_{50})$hydrocarbyl interrupted by 0, 1, 2, or 3 groups independently selected from —O—, —S—, substituted or unsubstituted —NH—, —$(CH_2$—$CH_2$—$O)_{n3}$—, and —$(CH_2$—$CH_2$—$CH_2$—$O)_{n3}$—, wherein n3 is about 1 to about 10,000 (e.g., about 1 to about 100, or about 1 to about 10, or about 1, 2, 3, 4, 5, 6, 7, 8, 9, 10, 12, 14, 16, 18, 20, 25, 30, 35, 40, 45, 50, 75, 100, 125, 150, 175, 200, 250, 300, 400, 500, 750, 1,000, 1,500, 2,000, 2,500, 5,000, 7,500, or about 10,000 or more). The variables $R^6$, $R^7$, $R^8$ can each be independently selected from the group consisting of —H and $(C_1-C_{20})$hydrocarbyl. The variables $R^6$, $R^7$, $R^8$ can each be independently selected from the group consisting of —H and $(C_1-C_{10})$alkyl. The variables $R^6$, $R^7$, $R^8$ can each be —H. The variable $L^2$ can be selected from the group consisting of a bond and substituted or unsubstituted $(C_1-C_{50})$hydrocarbylene interrupted by 0, 1, 2, or 3 groups independently selected from —O—, —S—, substituted or unsubstituted —NH—, —$(CH_2$—$CH_2$—$O)_{n4}$—, and —$(CH_2$—$CH_2$—$CH_2$—$O)_{n4}$—, wherein n4 is about 1 to about 10,000 (e.g., about 1 to about 100, or about 1 to about 10, or about 1, 2, 3, 4, 5, 6, 7, 8, 9, 10, 12, 14, 16, 18, 20, 25, 30, 35, 40, 45, 50, 75, 100, 125, 150, 175, 200, 250, 300, 400, 500, 750, 1,000, 1,500, 2,000, 2,500, 5,000, 7,500, or about 10,000 or more). The variable $L^2$ can be selected from the group consisting of a bond and $(C_1-C_{20})$hydrocarbylene. The variable $L^2$ can be selected from the group consisting of a bond and $(C_1-C_{10})$alkylene. The variable $L^2$ can be a bond. The variable $R^9$ can be selected from the group consisting of substituted $(C_1-C_{20})$aryl and substituted or unsubstituted $(C_1-C_{20})$heteroaryl. The variable $R^9$ can be $(C_1-C_{10})$aryl. The variable $R^9$ can be substituted or unsubstituted phenyl. The variable $R^9$ can be phenyl. Repeating group B can have the structure:

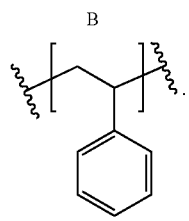

Repeating group B can form any suitable proportion of the polymer, such as about 1 mol % to about 90 mol % of the polymer, about 5 mol % to about 40 mol %, or about 1 mol % or less, or less than, equal to, or more than about 2 mol %, 4, 6, 8, 10, 12, 14, 16, 18, 20, 22, 24, 26, 28, 30, 32, 34, 36, 38, 40, 45, 50, 55, 60, 65, 70, 75, 80, 85, or about 90 mol % or more.

The polymer can further include repeating group C, a crosslinker including intermolecular crosslinks (a repeating group that includes crosslinks to different molecules of the polymer), intramolecular crosslinks (a repeating group that includes crosslinks to the same molecule of the polymer), or a combination thereof. Repeating group C can form any suitable proportion of the polymer, such as about 0.001 mol % to about 20 mol % of the polymer, about 0.001 mol % to about 10 mol %, about 0.001 mol % or less, or less than, equal to, or more than 0.01 mol %, 0.1, 0.2, 0.4, 0.6, 0.8, 1, 1.2, 1.4, 1.6, 1.8, 2, 2.2, 2.4, 2.6, 2.8, 3, 3.2, 3.4, 3.6, 3.8, 4, 4.5, 5, 5.5, 6, 7, 8, 9, 10, 12, 14, 16, 18, or about 20 mol % or more. In some embodiments, repeating groups A, B, and C are about 100 mol % of the polymer.

Repeating group C can be formed from (e.g., a polymerization product of) a polyethylenically unsaturated monomer, such as a polyvinyl monomer. Repeating group C can be formed from (e.g., a polymerization product of) a molecule including two or more vinyl groups, wherein each vinyl group is independently substituted or unsubstituted. Repeating group C can be formed from a molecule selected from the group consisting of $(C_1-C_{20})$alkylenebiacrylamide, a poly(($(C_1-C_{20})$alkenyl)-substituted mono- or poly-$(C_1-C_{20})$ alkyl ether, a poly($C_2-C_{20}$)alkenylbenzene, pentaerythritol triallyl ether, a polyethyleneglycol-diacrylate, polyethyleneglycol-dimethacrylate, N,N'-methylenebisacrylamide, epichlorohydrin, divinyl sulfone, glycidyl methacrylate, an alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate.

Repeating group C can have the structure:

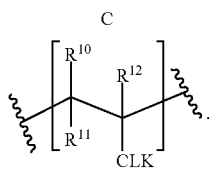

The variables $R^{10}$, $R^{11}$, and $R^{12}$ can each be independently selected from the group consisting of —H, halide, and substituted or unsubstituted $(C_1-C_{50})$hydrocarbyl interrupted by 0, 1, 2, or 3 groups independently selected from —O—, —S—, substituted or unsubstituted —NH—, —(CH$_2$—CH$_2$—O)$_{n5}$—, and —(CH$_2$—CH$_2$—CH$_2$—O)$_{n5}$—, wherein n5 is about 1 to about 10,000 (e.g., about 1 to about 100, or about 1 to about 10, or about 1, 2, 3, 4, 5, 6, 7, 8, 9, 10, 12, 14, 16, 18, 20, 25, 30, 35, 40, 45, 50, 75, 100, 125, 150, 175, 200, 250, 300, 400, 500, 750, 1,000, 1,500, 2,000, 2,500, 5,000, 7,500, or about 10,000 or more). The variables R$^{10}$, R$^{11}$, and R$^{12}$ can each be independently selected from the group consisting of —H and (C$_1$-C$_{20}$)hydrocarbyl. The variables R$^{10}$, R$^{11}$, and R$^{12}$ can each be independently selected from the group consisting of —H and (C$_1$-C$_{10}$)alkyl. The variables R$^{10}$ and R$^{11}$ can be —H, and R$^{12}$ can be methyl.

The variable CLK can be at least one of an intermolecular and an intramolecular crosslink including a substituted or unsubstituted (C$_1$-C$_{50}$)hydrocarbylene (e.g., wherein a divalent hydrocarbyl (i.e., hydrocarbylene) corresponds to a crosslink connected to 2 repeating groups, wherein the hydrocarbyl is trivalent, tetravalent, and the like when the crosslink connects to 3, 4, or more repeating groups, respectively) interrupted by 0, 1, 2, or 3 groups independently selected from —O—, —S—, substituted or unsubstituted —NH—, —(CH$_2$—CH$_2$—O)$_{n6}$—, and —(CH$_2$—CH$_2$—CH$_2$—O)$_{n6}$—, wherein n6 is about 1 to about 10,000 (e.g., about 1 to about 100, or about 1 to about 10, or about 1, 2, 3, 4, 5, 6, 7, 8, 9, 10, 12, 14, 16, 18, 20, 25, 30, 35, 40, 45, 50, 75, 100, 125, 150, 175, 200, 250, 300, 400, 500, 750, 1,000, 1,500, 2,000, 2,500, 5,000, 7,500, or about 10,000 or more). The variable CLK can be —C(O)-A$^2$-L$^3$-A$^2$-C(O)—. Repeating group C can have the structure:

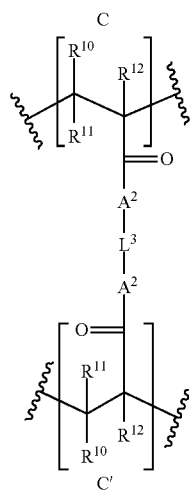

Repeating group C' can be the repeating group C in the same polymer molecule or in a different molecule of the polymer. At each occurrence, R$^{10}$, R$^{11}$, and R$^{12}$ can be independently selected. At each occurrence, A$^2$ can be independently selected from the group consisting of —O— and —NH—. The variable A$^2$ can be —O—. The variable L$^3$ can be a substituted or unsubstituted (C$_1$-C$_{48}$)hydrocarbylene interrupted by 0, 1, 2, or 3 groups independently selected from —O—, —S—, substituted or unsubstituted —NH—, —(CH$_2$—CH$_2$—O)$_{n7}$—, and —(CH$_2$—CH$_2$—CH$_2$—O)$_{n7}$—, wherein n7 is about 1 to about 10,000 (e.g., about 1 to about 100, or about 1 to about 10, or about 1, 2, 3, 4, 5, 6, 7, 8, 9, 10, 12, 14, 16, 18, 20, 25, 30, 35, 40, 45, 50, 75, 100, 125, 150, 175, 200, 250, 300, 400, 500, 750, 1,000, 1,500, 2,000, 2,500, 5,000, 7,500, or about 10,000 or more).

The variable L$^3$ can be (C$_1$-C$_{20}$)hydrocarbylene. The variable L$^3$ can be (C$_1$-C$_{10}$)alkylene. The variable L$^3$ can be ethylene. The repeating group C can have the structure:

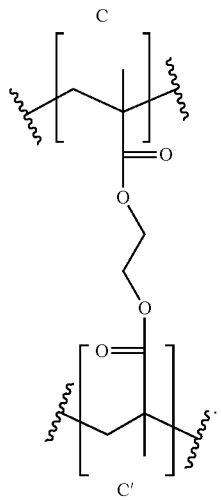

The polymer can include repeating groups having the structure:

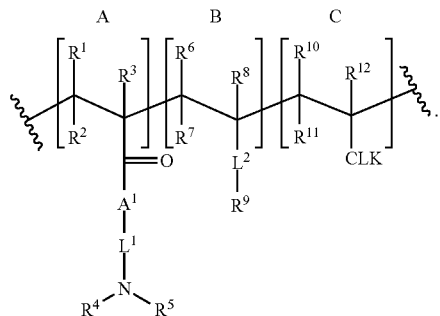

Repeating groups A, B, and C can have a random or block copolymer arrangement and are in the order shown or any other order. At each occurrence, repeating groups A, B, and C can independently occur in the direction shown or in the opposite direction. The variable A$^1$ can be selected from the group consisting of —O— and —NH—. The variables R$^1$, R$^2$, R$^3$, R$^4$, and R$^5$ can each be independently selected from the group consisting of —H, halide, and substituted or unsubstituted (C$_1$-C$_{50}$)hydrocarbyl interrupted by 0, 1, 2, or 3 groups independently selected from —O—, —S—, substituted or unsubstituted —NH—, —(CH$_2$—CH$_2$—O)$_{n1}$—, and —(CH$_2$—CH$_2$—CH$_2$—O)$_{n1}$—, wherein n1 is about 1 to about 10,000. The variable L$^1$ can be substituted or unsubstituted (C$_1$-C$_{50}$)hydrocarbylene interrupted by 0, 1, 2, or 3 groups independently selected from —O—, —S—, substituted or unsubstituted —NH—, —(CH$_2$—CH$_2$—O)$_{n2}$—, and —(CH$_2$—CH$_2$—CH$_2$—O)$_{n2}$—, wherein n2 is about 1 to about 10,000. The variables R$^6$, R$^7$, R$^8$ can each be independently selected from the group consisting of —H, halide, and substituted or unsubstituted $(C_1$-$C_{50})$hydrocarbyl interrupted by 0, 1, 2, or 3 groups independently selected from —O—, —S—, substituted or unsubstituted —NH—, —($CH_2$—$CH_2$—O$)_{n3}$—, and —($CH_2$—$CH_2$—$CH_2$—O$)_{n3}$—, wherein n3 is about 1 to about 10,000. The variable $L^2$ can be selected from the group consisting of a bond and substituted or unsubstituted $(C_1$-$C_{50})$hydrocarbylene interrupted by 0, 1, 2, or 3 groups independently selected from —O—, —S—, substituted or unsubstituted —NH—, —($CH_2$—$CH_2$—O$)_{n4}$—, and —($CH_2$—$CH_2$—$CH_2$—O$)_{n4}$—, wherein n4 is about 1 to about 10,000. The variable $R^9$ can be selected from the group consisting of substituted $(C_1$-$C_{20})$aryl and substituted or unsubstituted $(C_1$-$C_{20})$heteroaryl. The variables $R^{10}$, $R^{11}$, and $R^{12}$ can each be independently selected from the group consisting of —H, halide, and substituted or unsubstituted $(C_1$-$C_{50})$hydrocarbyl interrupted by 0, 1, 2, or 3 groups independently selected from —O—, —S—, substituted or unsubstituted —NH—, —($CH_2$—$CH_2$—O$)_{n5}$—, and —($CH_2$—$CH_2$—$CH_2$—O$)_{n5}$—, wherein n5 is about 1 to about 10,000. The variable CLK can be at least one of an intermolecular and an intramolecular crosslink including a substituted or unsubstituted $(C_1$-$C_{50})$hydrocarbylene interrupted by 0, 1, 2, or 3 groups independently selected from —O—, —S—, substituted or unsubstituted —NH—, —($CH_2$—$CH_2$—O$)_{n6}$—, and —($CH_2$—$CH_2$—$CH_2$—O$)_{n6}$—, wherein n6 is about 1 to about 10,000.

The polymer can include repeating groups having the structure:

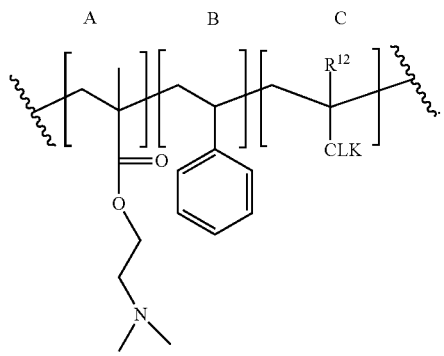

Repeating groups A, B, and C can have a random or block copolymer arrangement and are in the order shown or any other order. At each occurrence, repeating groups A, B, and C can independently occur in the direction shown or in the opposite direction. The variable $R^{12}$ can be —H or methyl. The variable CLK can be at least one of an intermolecular and an intramolecular crosslink including a substituted or unsubstituted $(C_1$-$C_{50})$hydrocarbylene interrupted by 0, 1, 2, or 3 groups independently selected from —O—, —S—, substituted or unsubstituted —NH—, —($CH_2$—$CH_2$—O$)_{n6}$—, and —($CH_2$—$CH_2$—$CH_2$—O$)_{n6}$—, wherein n6 is about 1 to about 10,000.

The polymer can include repeating groups having the structure:

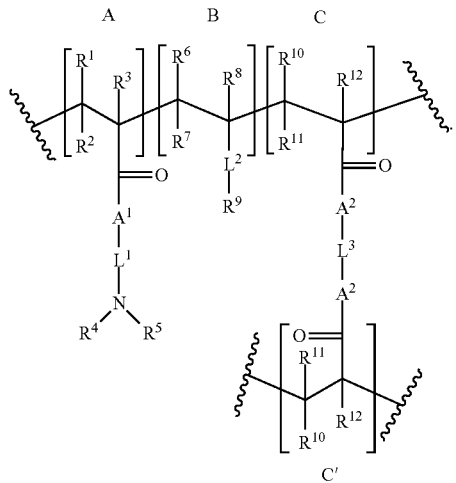

Repeating groups A, B, and C can have a random or block copolymer arrangement and are in the order shown or any other order. At each occurrence, repeating groups A, B, and C can independently occur in the direction shown or in the opposite direction. The variable $A^1$ can be selected from the group consisting of —O— and —NH—. The variables $R^1$, $R^2$, $R^3$, $R^4$, and $R^5$ can each be independently selected from the group consisting of —H, halide, and substituted or unsubstituted $(C_1$-$C_{50})$hydrocarbyl interrupted by 0, 1, 2, or 3 groups independently selected from —O—, —S—, substituted or unsubstituted —NH—, —($CH_2$—$CH_2$—O$)_{n1}$—, and —($CH_2$—$CH_2$—$CH_2$—O$)_{n1}$—, wherein n1 is about 1 to about 10,000. The variable $L^1$ can be substituted or unsubstituted $(C_1$-$C_{50})$hydrocarbylene interrupted by 0, 1, 2, or 3 groups independently selected from —O—, —S—, substituted or unsubstituted —NH—, —($CH_2$—$CH_2$—O$)_{n2}$—, and —($CH_2$—$CH_2$—$CH_2$—O$)_{n2}$—, wherein n2 is about 1 to about 10,000. The variables $R^6$, $R^7$, $R^8$ can each be independently selected from the group consisting of —H, halide, and substituted or unsubstituted $(C_1$-$C_{50})$hydrocarbyl interrupted by 0, 1, 2, or 3 groups independently selected from —O—, —S—, substituted or unsubstituted —NH—, —($CH_2$—$CH_2$—O$)_{n3}$—, and —($CH_2$—$CH_2$—$CH_2$—O$)_{n3}$—, wherein n3 is about 1 to about 10,000. The variable $L^2$ can be selected from the group consisting of a bond and substituted or unsubstituted $(C_1$-$C_{50})$hydrocarbylene interrupted by 0, 1, 2, or 3 groups independently selected from —O—, —S—, substituted or unsubstituted —NH—, —($CH_2$—$CH_2$—O$)_{n4}$—, and —($CH_2$—$CH_2$—$CH_2$—O$)_{n4}$—, wherein n4 is about 1 to about 10,000. The variable $R^9$ can be selected from the group consisting of substituted $(C_1$-$C_{20})$aryl and substituted or unsubstituted $(C_1$-$C_{20})$heteroaryl. At each occurrence, the variables $R^{10}$, $R^{11}$, and $R^{12}$ can each be independently selected from the group consisting of —H, halide, and substituted or unsubstituted $(C_1$-$C_{50})$hydrocarbyl interrupted by 0, 1, 2, or 3 groups independently selected from —O—, —S—, substituted or unsubstituted —NH—, —($CH_2$—$CH_2$—O$)_{n5}$—, and —($CH_2$—$CH_2$—$CH_2$—O$)_{n5}$—, wherein n5 is about 1 to about 10,000. At each occurrence, $A^2$ can be independently selected from the group consisting of —O— and —NH—. The variable $L^3$ can be a substituted or unsubstituted $(C_1$-$C_{48})$hydrocarbylene interrupted by 0, 1, 2, or 3 groups independently selected from —O—, —S—, substituted or unsubstituted —NH—, —(CH$_2$—CH$_2$—O)$_{n7}$—, and —(CH$_2$—CH$_2$—CH$_2$—O)$_{n7}$—, wherein n7 is about 1 to about 10,000. Repeating group C' can be a repeating group C in the same polymer molecule or in a different molecule of the polymer.

The polymer can include repeating groups having the structure:

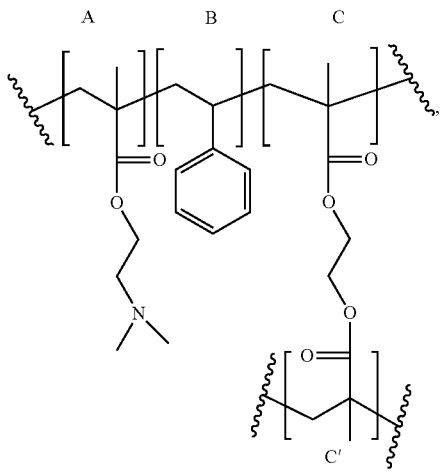

Repeating groups A, B, and C can have a random or block copolymer arrangement and are in the order shown or any other order. At each occurrence, repeating groups A, B, and C can independently occur in the direction shown or in the opposite direction. Repeating group C' can be a repeating group C in the same polymer molecule or in a different molecule of the polymer.

Other Components.

The coated proppant, the coating, the composition including the coated proppant, or a mixture including the composition, can include any suitable additional component in any suitable proportion, such that the coated proppant, composition, or mixture including the same, can be used as described herein. Any component listed in this section can be present or not present in the composition or a mixture including the same.

In some embodiments, the coating or the proppant can include an adhesive or a coupling agent to increase adhesion between the proppant and the polymer in the coating. The adhesive can be any suitable adhesive that bonds the polymer to the proppant (e.g., via tackiness or stickiness). The coupling agent can be any suitable coupling agent that improves the surface of the proppant for adhesion of the polymer thereto (e.g., by changing the chemical properties of the surface of the proppant, such as changing the proportion of various chemical moieties thereon). The coating (e.g., between the coating and the proppant) or the proppant (e.g., the surface of the proppant) can include one coupling agent, or multiple coupling agents. The coupling agent can be any suitable coupling agent. The coupling agent can be an organosilicon-based coupling agent, such as an aminosilane, an epoxysilane, an organosilane, and organohalogen silane, an organosilane ester, a silyl acetamide, a cyclosiloxane, a cyclosilazane, a silazane, or any combination thereof. The silane coupling agent can be a (C$_1$-C$_{30}$)hydrocarbyl-substituted trimethoxysilane, wherein the hydrocarbyl group is substituted or unsubstituted. The silane coupling agent can be N-2-(aminoethyl)-3-aminopropyltrimethoxysilane, 3-glycidoxypropyltrimethoxysilane, or n-beta-(aminoethyl)-gamma-aminopropyltrimethoxysilane. In various embodiments, the coupling agent can react with Si—OH or Si—O-alkyl moieties on the surface of the proppant to make the surface of the proppant a better surface for adhesion of the polymer thereto.

In some embodiments, the composition or a mixture including the same includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000.1 wt % to about 10 wt % of the composition or a mixture including the same, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more of the composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly((C$_2$-C$_{10}$)alkene), wherein the (C$_2$-C$_{10}$) alkene is substituted or unsubstituted. The viscosifier can include at least one of poly(acrylic acid) or (C$_1$-C$_5$)alkyl esters thereof, poly(methacrylic acid) or (C$_1$-C$_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted (C$_2$-C$_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen-containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition or a mixture including the same can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly (($C_1$-$C_{20}$)alkenyl)-substituted mono- or poly-($C_1$-$C_{20}$)alkyl ether (e.g., pentaerythritol allyl ether), and a poly($C_2$-$C_{20}$) alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the composition or a mixture including the same, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

The coating of the coated proppant, the composition including the coated proppant, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the coated proppant or a mixture including the same can include or can be any suitable downhole fluid. The composition including the coated proppant can be combined with any suitable downhole fluid before, during, or after the placement of the composition in the subterranean formation or the contacting of the composition and the subterranean material. In some examples, the composition including the coated proppant is combined with a downhole fluid above the surface, and then the combined composition is placed in a subterranean formation or contacted with a subterranean material. In another example, the composition including the coated proppant is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the coated proppant (e.g., the coating), a composition including the same, or a mixture including the composition, can include any suitable amount of any suitable material used in a downhole fluid. For example, coated proppant coating, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, graphene (e.g., a graphene material, such as a nanomaterial, to improve mechanical properties and thermal stability of coating) or a combination thereof. Any suitable proportion of the coating of the proppant, the composition including the coated proppant, or a mixture including the composition, can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more.

System or Apparatus.

In various embodiments, the present invention provides a system. The system can be any suitable system that can use or that can be generated by use of an embodiment of the proppant or composition including the same described herein in a subterranean formation, or that can perform or be generated by performance of a method for using the proppant or composition including the same described herein.

The system can include a tubular disposed in a subterranean formation. The system can also include a pump configured to pump a composition including an embodiment of the proppant including a coating thereon in the subterranean formation through the tubular, wherein the coating is swellable with aqueous medium in response to a trigger including acidic pH, $CO_2$, $H_2S$, or a combination thereof.

Various embodiments provide systems and apparatus configured for delivering the composition described herein to a subterranean location and for using the composition therein, such as for a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a composition including the coated proppant described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

FIG. 1 shows an illustrative schematic of systems and apparatuses that can deliver embodiments of the compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the composition can, in some embodiments, flow back to wellhead 14 and exit subterranean formation 18. The composition that flows back can be substantially diminished in the concentration of the coated proppant therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Coated Proppant for Treatment of a Subterranean Formation, and Composition Including the Same.

Various embodiments provide a coated proppant for treatment of a subterranean formation, or a composition including the same. The coated proppant or composition including the same can be any suitable coated proppant or composition including the same that can be used to perform an embodiment of the method for treatment of a subterranean formation described herein.

The coated proppant can include a coating thereon, wherein the coating is swellable with aqueous medium in response to a trigger including acidic pH, $CO_2$, $H_2S$, or a combination thereof. In various embodiments, the present invention provides composition including the coated proppant, such as a fracturing fluid.

In various embodiments, the present invention provides a proppant for treatment of a subterranean formation, the proppant including a coating thereon. The coating can be swellable with aqueous medium in response to a trigger including acidic pH, $CO_2$, $H_2S$, or a combination thereof. The coating can include a polymer including repeating groups having the structure:

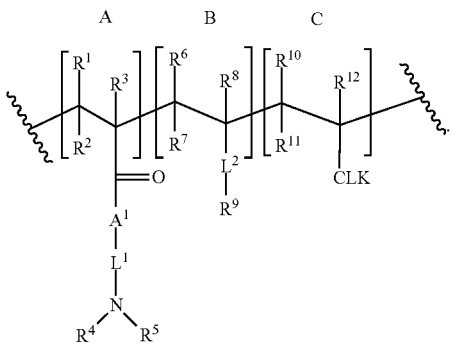

Repeating groups A, B, and C can have a random or block copolymer arrangement and are in the order shown or any other order. At each occurrence, repeating groups A, B, and C can independently occur in the direction shown or in the opposite direction. Repeating group A can be about 50 mol % to about 98.999 mol % of the polymer. Repeating group B can be about 1 mol % to about 50 mol % of the polymer. Repeating group C can be about 0.001 mol % to about 20 mol % of the polymer. The variable $A^1$ can be selected from the group consisting of —O— and —NH—. The variables $R^1$, $R^2$, $R^3$, $R^4$, and $R^5$ can each be independently selected from the group consisting of —H, halide, and substituted or unsubstituted $(C_1$-$C_{50})$hydrocarbyl interrupted by 0, 1, 2, or 3 groups independently selected from —O—, —S—, substituted or unsubstituted —NH—, —$(CH_2$—$CH_2$—$O)_{n1}$—, and —$(CH_2$—$CH_2$—$CH_2$—$O)_{n1}$—, wherein n1 is about 1 to about 10,000. The variable $L^1$ can be substituted or unsubstituted $(C_1$-$C_{50})$hydrocarbylene interrupted by 0, 1, 2, or 3 groups independently selected from —O—, —S—, substituted or unsubstituted —NH—, —$(CH_2$—$CH_2$—$O)_{n2}$—, and —$(CH_2$—$CH_2$—$CH_2$—$O)_{n2}$—, wherein n2 is about 1 to about 10,000. The variables $R^6$, $R^7$, $R^8$ can each be independently selected from the group consisting of —H, halide, and substituted or unsubstituted $(C_1$-$C_{50})$hydrocarbyl interrupted by 0, 1, 2, or 3 groups independently selected from —O—, —S—, substituted or unsubstituted —NH—, —$(CH_2$—$CH_2$—$O)_{n3}$—, and —$(CH_2$—$CH_2$—$CH_2$—$O)_{n3}$—, wherein n3 is about 1 to about 10,000. The variable $L^2$ can be selected from the group consisting of a bond and substituted or unsubstituted $(C_1-C_{50})$hydrocarbylene interrupted by 0, 1, 2, or 3 groups independently selected from —O—, —S—, substituted or unsubstituted —NH—, —$(CH_2-CH_2-O)_{n4}$—, and —$(CH_2-CH_2-CH_2-O)_{n4}$—, wherein n4 is about 1 to about 10,000. The variable $R^9$ can be selected from the group consisting of substituted $(C_1-C_{20})$aryl and substituted or unsubstituted $(C_1-C_{20})$heteroaryl. The variables $R^{10}$, $R^{11}$, and $R^{12}$ can each be independently selected from the group consisting of —H, halide, and substituted or unsubstituted $(C_1-C_{50})$hydrocarbyl interrupted by 0, 1, 2, or 3 groups independently selected from —O—, —S—, substituted or unsubstituted —NH—, —$(CH_2-CH_2-O)_{n5}$—, and —$(CH_2-CH_2-CH_2-O)_{n5}$—, wherein n5 is about 1 to about 10,000. The variable CLK can be at least one of an intermolecular and an intramolecular crosslink including a substituted or unsubstituted $(C_1-C_{50})$hydrocarbylene interrupted by 0, 1, 2, or 3 groups independently selected from —O—, —S—, substituted or unsubstituted —NH—, —$(CH_2-CH_2-O)_{n6}$—, and —$(CH_2-CH_2-CH_2-O)_{n6}$—, wherein n6 is about 1 to about 10,000.

Method for Preparing a Composition for Treatment of a Subterranean Formation.

In various embodiments, the present invention provides a method for preparing a proppant for treatment of a subterranean formation, or a composition that includes the same. The method can be any suitable method that produces a proppant or composition described herein. For example, the method can include coating a proppant with a coating that is swellable with aqueous medium in response to a trigger including acidic pH, $CO_2$, $H_2S$, or a combination thereof.

EXAMPLES

Various embodiments of the present invention can be better understood by reference to the following Examples which are offered by way of illustration. The present invention is not limited to the Examples given herein.

Example 1. Formation of Coated Proppant

A polymerizable mixture was formed that included 78 mol % N,N-dimethylaminoethyl methacrylate (DMAEMA), 20 mol % styrene, and 2 mol % ethylene glycol dimethacrylate (EDGMA).

A 15 wt % solution of the polymerizable mixture was formed with water. The solution including the polymerizable mixture and azobisisobutyronitrile (AIBN) 1 wt % as a free radical initiator was added to a 20/40 mesh synthetic proppant and mixed with a spatula to uniformly coat the proppant surface. The proppant was heated in an oven at 54° C. for 3 hours, with periodic stirring to prevent the particles from sticking together. The resulting polymer-coated proppant was free-flowing, and had a thickness of about 100 μm to 1000 μm.

Example 2. Swelling of Coated Proppant

Figure 2A:
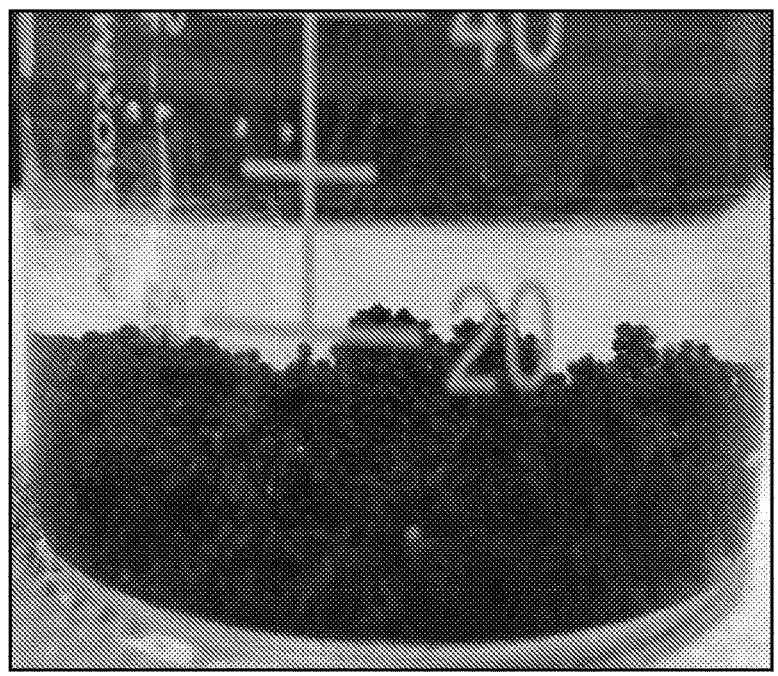
FIG. 2A is a photograph of coated proppant in tap water having a pH of 7, in accordance with various embodiments.
Figure 2B:
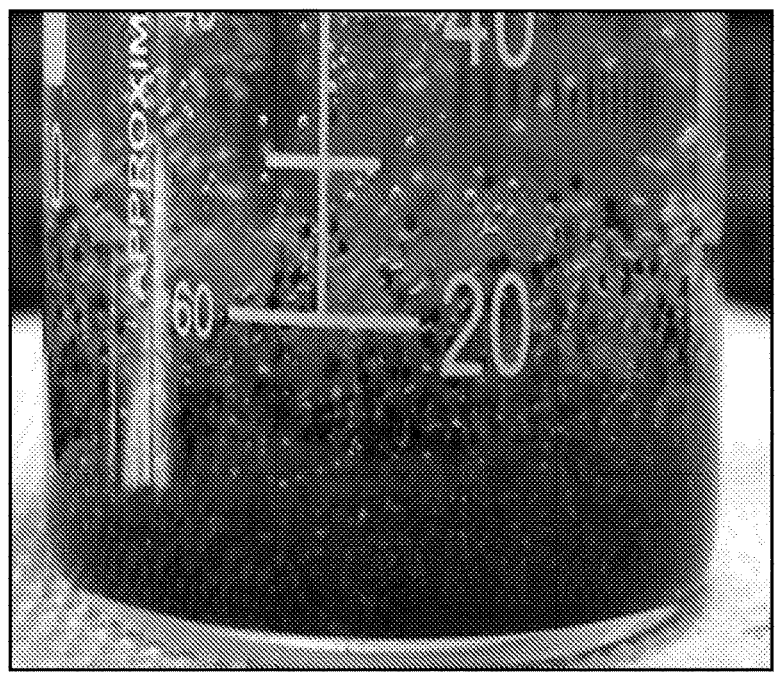
FIG. 2B is a photograph of coated proppant in tap water having a pH of 6.5, wherein the coating is swollen with water, in accordance with various embodiments.
Figure 3A:
FIGS. 3A-C are images from an optical microscope showing proppant having a swollen coating thereon, in accordance with various embodiments.
Figure 3B:
Figure 3C:

To the coated free-flowing proppant of Example 1, tap water of pH 7 was added. No swelling was observed, as shown in the photograph reproduced in FIG. 2A, taken less than 30 minutes after adding the proppant to the water. A small quantity of acetic acid was added to reduce the pH of water to 6.5. In response to the acidic pH, the coating of the polymer-coated proppant swelled immediately. The swollen coating increased the volume of the coated proppant and resulted in a greater buoyancy force, which kept the proppant suspended in water, as shown in the photograph reproduced in FIG. 2B. Optical microscope pictures of the proppant having swollen coating thereon are shown in FIGS. 3A-C.

Example 3. Thermogravimetric Analysis of Polymer

Figure 4:
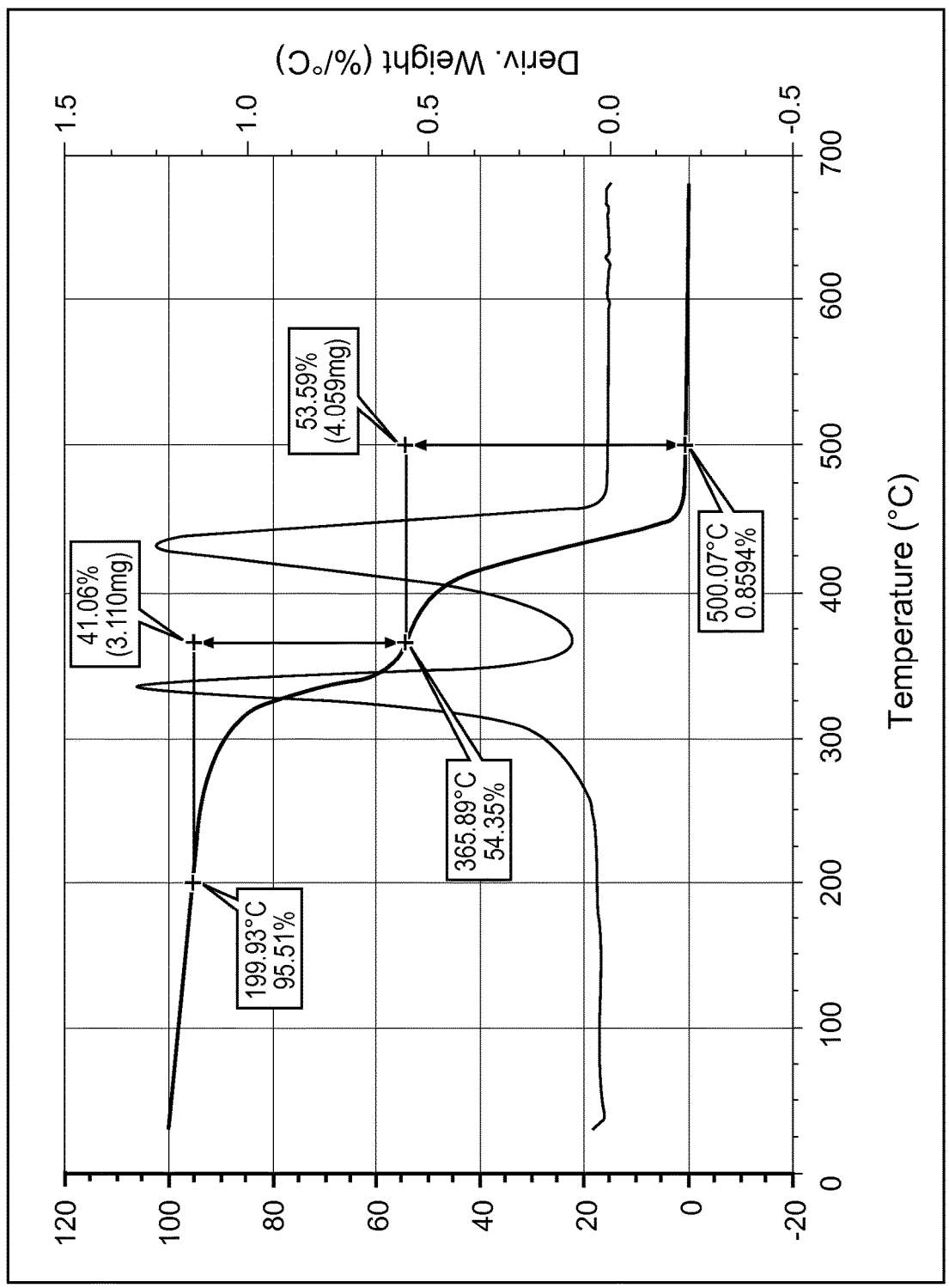
FIG. 4 illustrates a thermogravimetric analysis of the coating of a polymer-coated proppant, in accordance with various embodiments.

A thermogravimetric analysis of the polymer of the polymer-coated particles of Example 1 was performed. The results are illustrated in FIG. 4.

Example 4. Breaking Test

A breaking test was also carried out on the proppant having a swollen coating of Example 2. A mixture of an activator for an oxidative breaker and HT Breaker™ (oxidive breakers) was added to aqueous solution. The polymer was completely broken leaving little to no residue behind on the proppant.

Example 5. Removal of Acidic Stimuli

The aqueous medium containing proppant having a swollen coating of Example 2 was raised to pH 7 by addition of sodium hydroxide solution. The polymer coating shrank to its original size in about 3 to 4 h.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

placing in the subterranean formation a proppant comprising a coating thereon, wherein the coating is swellable with aqueous medium in response to a trigger comprising acidic pH, $CO_2$, $H_2S$, or a combination thereof.

Embodiment 2 provides the method of Embodiment 1, wherein a composition comprises the proppant comprising the coating thereon, wherein placing the proppant in the subterranean formation comprises placing the composition in the subterranean formation.

Embodiment 3 provides the method of Embodiment 2, wherein the coated proppant is about 0.001 wt % to about 99.9 wt % of the composition.

Embodiment 4 provides the method of any one of Embodiments 2-3, wherein the coated proppant is about 0.01 wt % to about 50 wt % of the composition.

Embodiment 5 provides the method of any one of Embodiments 1-4, wherein the coating is substantially unswollen.

Embodiment 6 provides the method of any one of Embodiments 1-5, wherein the coating is at least partially swollen.

Embodiment 7 provides the method of any one of Embodiments 2-6, wherein the method further comprises obtaining or providing the composition, wherein the obtaining or providing of the composition occurs above-surface.

Embodiment 8 provides the method of any one of Embodiments 2-7, wherein the method further comprises obtaining or providing the composition, wherein the obtaining or providing of the composition occurs in the subterranean formation.

Embodiment 9 provides the method of any one of Embodiments 2-8, wherein the composition comprises a fracturing fluid.

Embodiment 10 provides the method of any one of Embodiments 2-9, wherein the composition comprises a fracturing fluid for fracturing low permeability formations.

Embodiment 11 provides the method of any one of Embodiments 2-10, wherein the placing of the composition in the subterranean formation comprises fracturing at least part of the subterranean formation to form at least one subterranean fracture.

Embodiment 12 provides the method of any one of Embodiments 2-11, wherein the composition comprises water.

Embodiment 13 provides the method of Embodiment 12, wherein the water is fresh water, brine, produced water, flowback water, brackish water, sea water, or a combination thereof.

Embodiment 14 provides the method of any one of Embodiments 12-13, wherein the water is about 0.001 wt % to about 99.999 wt % of the composition.

Embodiment 15 provides the method of any one of Embodiments 12-14, wherein the water forms at least 50 vol % of the composition.

Embodiment 16 provides the method of any one of Embodiments 2-15, wherein the composition is substantially free of viscosifiers.

Embodiment 17 provides the method of any one of Embodiments 2-16, wherein the composition is substantially free of linear gel and crosslinked fluids.

Embodiment 18 provides the method of any one of Embodiments 2-17, wherein the composition is substantially free of viscosifying polysaccharides.

Embodiment 19 provides the method of any one of Embodiments 1-18, wherein the subterranean formation is a low permeability subterranean formation.

Embodiment 20 provides the method of any one of Embodiments 2-19, wherein the composition comprises a breaker.

Embodiment 21 provides the method of any one of Embodiments 1-20, further comprising breaking down the coating using a breaker.

Embodiment 22 provides the method of any one of Embodiments 1-21, wherein the coating is substantially unswollen, further comprising triggering swelling of the coating on the proppant by exposing to aqueous medium, the triggering comprising exposing the coating to acidic pH, $CO_2$, $H_2S$, or a combination thereof.

Embodiment 23 provides the method of Embodiment 22, wherein the triggering occurs above-surface.

Embodiment 24 provides the method of any one of Embodiments 22-23, wherein the triggering occurs in the subterranean formation.

Embodiment 25 provides the method of any one of Embodiments 22-24, wherein the triggering comprises modifying the pH of the ambient environment of the coated proppant, adding $CO_2$ to the ambient environment of the coated proppant, adding $H_2S$ to the ambient environment of the coated proppant, or a combination thereof.

Embodiment 26 provides the method of any one of Embodiments 22-25, wherein the triggering comprises placing the coated proppant in an ambient environment that comprises an acidic pH, $CO_2$, $H_2S$, or a combination thereof.

Embodiment 27 provides the method of any one of Embodiments 22-26, wherein after the triggering and the swelling, the coated proppant has a greater buoyancy.

Embodiment 28 provides the method of any one of Embodiments 1-27, wherein the proppant comprises sand, gravel, glass beads, metal beads, polymer beads, ground products from shells and seeds, ceramic, bauxite, tetrafluoroethylene materials, fruit pit materials, processed wood, silica, alumina, fumed silica, carbon black, graphite, mica, titanium dioxide, meta-silicate, calcium silicate, kaolin, talc, zirconia, boron, fly ash, hollow glass microspheres, solid glass, or mixtures thereof.

Embodiment 29 provides the method of any one of Embodiments 1-28, wherein the proppant has a particle size of about 0.001 mm to about 5 mm.

Embodiment 30 provides the method of any one of Embodiments 1-29, wherein the coating covers about 1% to about 100% of the surface area of the proppant.

Embodiment 31 provides the method of any one of Embodiments 1-30, wherein the coating covers about 100% of the surface area of the proppant.

Embodiment 32 provides the method of any one of Embodiments 1-31, wherein in a substantially unswollen state the coating has a thickness of about 1 µm to about 5 mm.

Embodiment 33 provides the method of any one of Embodiments 1-32, wherein in a substantially unswollen state the coating has a thickness of about 10 µm to about 2 mm.

Embodiment 34 provides the method of any one of Embodiments 1-33, wherein the coating comprises a polymer that comprises a repeating group having the structure:

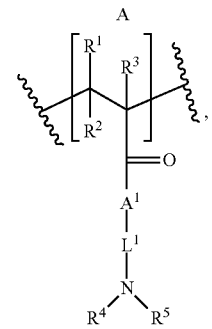

wherein $A^1$ is selected from the group consisting of —O— and —NH—, $R^1$, $R^2$, $R^3$, $R^4$, and $R^5$ are each independently selected from the group consisting of —H, halide, and substituted or unsubstituted ($C_1$-$C_{50}$)hydrocarbyl interrupted by 0, 1, 2, or 3 groups independently selected from —O—, —S—, substituted or unsubstituted —NH—, —(CH$_2$—CH$_2$—O)$_{n1}$—, and —(CH$_2$—CH$_2$—CH$_2$—O)$_{n1}$—, wherein n1 is about 1 to about 10,000, and L$^1$ is substituted or unsubstituted (C$_1$-C$_{50}$)hydrocarbylene interrupted by 0, 1, 2, or 3 groups independently selected from —O—, —S—, substituted or unsubstituted —NH—, —(CH$_2$—CH$_2$—O)$_{n2}$—, and —(CH$_2$—CH$_2$—CH$_2$—O)$_{n2}$—, wherein n2 is about 1 to about 10,000.

Embodiment 35 provides the method of Embodiment 34, wherein the polymer is about 10 wt % to about 100 wt % of the coating in a substantially unswollen state.

Embodiment 36 provides the method of any one of Embodiments 34-35, wherein the polymer is about 80 wt % to about 100 wt % of the coating in a substantially unswollen state.

Embodiment 37 provides the method of any one of Embodiments 34-36, wherein repeating group A is about 10 mol % to about 100 mol % of the polymer.

Embodiment 38 provides the method of any one of Embodiments 34-37, wherein repeating group A is about 60 mol % to about 95 mol % of the polymer.

Embodiment 39 provides the method of any one of Embodiments 34-38, wherein A$^1$ is —O—.

Embodiment 40 provides the method of any one of Embodiments 34-39, wherein R$^1$, R$^2$, R$^3$, R$^4$, and R$^5$ are each independently selected from the group consisting of —H and (C$_1$-C$_{20}$)hydrocarbyl.

Embodiment 41 provides the method of any one of Embodiments 34-40, wherein R$^1$, R$^2$, R$^3$, R$^4$, and R$^5$ are each independently selected from the group consisting of —H and (C$_1$-C$_{10}$)alkyl.

Embodiment 42 provides the method of any one of Embodiments 34-41, wherein R$^1$ and R$^2$ are —H, and R$^3$, R$^4$, and R$^5$ are methyl.

Embodiment 43 provides the method of any one of Embodiments 34-42, wherein L$^1$ is (C$_1$-C$_{20}$)hydrocarbylene.

Embodiment 44 provides the method of any one of Embodiments 34-43, wherein L$^1$ is (C$_1$-C$_{10}$)alkylene.

Embodiment 45 provides the method of any one of Embodiments 34-44, wherein L$^1$ is ethylene.

Embodiment 46 provides the method of any one of Embodiments 34-45, wherein repeating group A has the structure:

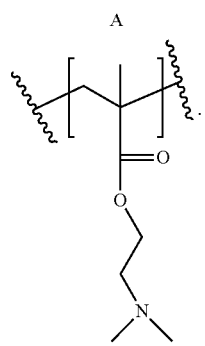

Embodiment 47 provides the method of any one of Embodiments 34-46, wherein the polymer further comprises a repeating group having the structure:

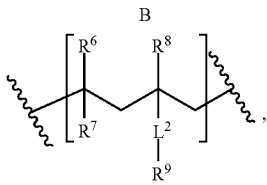

wherein

R$^6$, R$^7$, R$^8$ are each independently selected from the group consisting of —H, halide, and substituted or unsubstituted (C$_1$-C$_{50}$)hydrocarbyl interrupted by 0, 1, 2, or 3 groups independently selected from —O—, —S—, substituted or unsubstituted —NH—, —(CH$_2$—CH$_2$—O)$_{n3}$—, and —(CH$_2$—CH$_2$—CH$_2$—O)$_{n3}$—, wherein n3 is about 1 to about 10,000, L$^2$ is selected from the group consisting of a bond and substituted or unsubstituted (C$_1$-C$_{50}$)hydrocarbylene interrupted by 0, 1, 2, or 3 groups independently selected from —O—, —S—, substituted or unsubstituted —NH—, —(CH$_2$—CH$_2$—O)$_{n4}$—, and —(CH$_2$—CH$_2$—CH$_2$—O)$_{n4}$—, wherein n4 is about 1 to about 10,000, and R$^9$ is selected from the group consisting of substituted (C$_1$-C$_{20}$)aryl and substituted or unsubstituted (C$_1$-C$_{20}$) heteroaryl.

Embodiment 48 provides the method of Embodiment 47, wherein repeating group B is about 1 mol % to about 90 mol % of the polymer.

Embodiment 49 provides the method of any one of Embodiments 47-48, wherein repeating group B is about 5 mol % to about 40 mol % of the polymer.

Embodiment 50 provides the method of any one of Embodiments 47-49, wherein R$^6$, R$^7$, R$^8$ are each independently selected from the group consisting of —H and (C$_1$-C$_{20}$)hydrocarbyl.

Embodiment 51 provides the method of any one of Embodiments 47-50, wherein R$^6$, R$^7$, R$^8$ are each independently selected from the group consisting of —H and (C$_1$-C$_{10}$)alkyl.

Embodiment 52 provides the method of any one of Embodiments 47-51, wherein R$^6$, R$^7$, R$^8$ are each —H.

Embodiment 53 provides the method of any one of Embodiments 47-52, wherein L$^2$ is selected from the group consisting of a bond and (C$_1$-C$_{20}$)hydrocarbylene.

Embodiment 54 provides the method of any one of Embodiments 47-53, wherein L$^2$ is selected from the group consisting of a bond and (C$_1$-C$_{10}$)alkylene.

Embodiment 55 provides the method of any one of Embodiments 47-54, wherein L$^2$ is a bond.

Embodiment 56 provides the method of any one of Embodiments 47-55, wherein R$^9$ is (C$_1$-C$_{10}$)aryl.

Embodiment 57 provides the method of any one of Embodiments 47-56, wherein R$^9$ is substituted or unsubstituted phenyl.

Embodiment 58 provides the method of any one of Embodiments 47-57, wherein R$^9$ is phenyl.

Embodiment 59 provides the method of any one of Embodiments 47-58, wherein repeating group B has the structure:

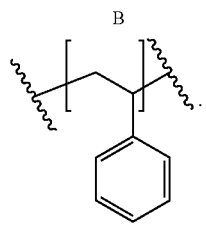

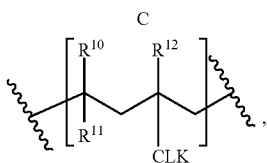

wherein $R^{10}$, $R^{11}$, and $R^{12}$ are each independently selected from the group consisting of —H, halide, and substituted or unsubstituted $(C_1$-$C_{50})$hydrocarbyl interrupted by 0, 1, 2, or 3 groups independently selected from —O—, —S—, substituted or unsubstituted —NH—, —(CH$_2$—CH$_2$—O)$_{n5}$—, and —(CH$_2$—CH$_2$—CH$_2$—O)$_{n5}$—, wherein n5 is about 1 to about 10,000, and CLK is at least one of an intermolecular and an intramolecular crosslink comprising a substituted or unsubstituted $(C_1$-$C_{50})$hydrocarbylene interrupted by 0, 1, 2, or 3 groups independently selected from —O—, —S—, substituted or unsubstituted —NH—, —(CH$_2$—CH$_2$—O)$_{n6}$—, and —(CH$_2$—CH$_2$—CH$_2$—O)$_{n6}$—, wherein n6 is about 1 to about 10,000.

Embodiment 60 provides the method of any one of Embodiments 34-59, wherein the polymer further comprises repeating group C comprising a crosslinker comprising intermolecular crosslinks, intramolecular crosslinks, or a combination thereof.

Embodiment 61 provides the method of Embodiment 60, wherein repeating groups A, B, and C are about 100 mol % of the polymer.

Embodiment 62 provides the method of any one of Embodiments 60-61, wherein repeating group C is about 0.001 mol % to about 20 mol % of the polymer.

Embodiment 63 provides the method of any one of Embodiments 60-62, wherein repeating group C is about 0.001 mol % to about 10 mol % of the polymer.

Embodiment 64 provides the method of any one of Embodiments 60-63, wherein repeating group C is formed from a polyethylenically unsaturated monomer.

Embodiment 65 provides the method of any one of Embodiments 60-64, wherein repeating group C is formed from a molecule comprising two or more vinyl groups, wherein each vinyl group is independently substituted or unsubstituted.

Embodiment 66 provides the method of any one of Embodiments 60-65, wherein repeating group C is formed from a molecule selected from the group consisting of $(C_1$-$C_{20})$alkylenebiacrylamide, a poly(($C_1$-$C_{20}$)alkenyl)-substituted mono- or poly-$(C_1$-$C_{20})$alkyl ether, a poly($C_2$-$C_{20}$)alkenylbenzene, pentaerythritol triallyl ether, a polyethyleneglycol-diacrylate, polyethyleneglycol-dimethacrylate, N,N'-methylenebisacrylamide, epichlorohydrin, divinyl sulfone, glycidyl methacrylate, an alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate.

Embodiment 67 provides the method of any one of Embodiments 60-66, wherein repeating group C has the structure:

Embodiment 68 provides the method of Embodiment 67, wherein $R^{10}$, $R^{11}$, and $R^{12}$ are each independently selected from the group consisting of —H and $(C_1$-$C_{20})$hydrocarbyl.

Embodiment 69 provides the method of any one of Embodiments 67-68, wherein $R^{10}$, $R^{11}$, and $R^{12}$ are each independently selected from the group consisting of —H and $(C_1$-$C_{10})$alkyl.

Embodiment 70 provides the method of any one of Embodiments 67-69, wherein $R^{10}$ and $R^{11}$ are —H, and $R^{12}$ is methyl.

Embodiment 71 provides the method of any one of Embodiments 67-70, wherein CLK is —C(O)-A$^2$-L$^3$-A$^2$-C(O)—, wherein at each occurrence, A$^2$ is independently selected from the group consisting of —O— and —NH—, and L$^3$ is a substituted or unsubstituted $(C_1$-$C_{48})$hydrocarbylene interrupted by 0, 1, 2, or 3 groups independently selected from —O—, —S—, substituted or unsubstituted —NH—, —(CH$_2$—CH$_2$—O)$_{n7}$—, and —(CH$_2$—CH$_2$—CH$_2$—O)$_{n7}$—, wherein n7 is about 1 to about 10,000.

Embodiment 72 provides the method of Embodiment 71, wherein repeating group C has the structure:

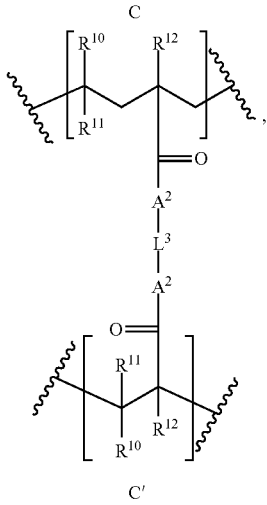

wherein
repeating group C' is a repeating group C in the same polymer molecule or in a different molecule of the polymer, and
at each occurrence, $R^{10}$, $R^{11}$, and $R^{12}$ are independently selected.

Embodiment 73 provides the method of any one of Embodiments 71-72, wherein $A^2$ is —O—.

Embodiment 74 provides the method of any one of Embodiments 71-73, wherein $L^3$ is $(C_1-C_{20})$hydrocarbylene.

Embodiment 75 provides the method of any one of Embodiments 71-74, wherein $L^3$ is $(C_1-C_{10})$alkylene.

Embodiment 76 provides the method of any one of Embodiments 71-75, wherein $L^3$ is ethylene.

Embodiment 77 provides the method of any one of Embodiments 60-76, wherein repeating group C has the structure:

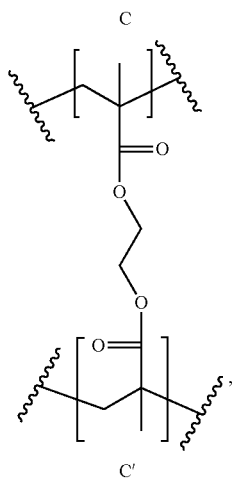

wherein
repeating group C' is a repeating group C in the same polymer molecule or in a different molecule of the polymer.

Embodiment 78 provides the method of any one of Embodiments 34-77, wherein the polymer comprises repeating groups having the structure:

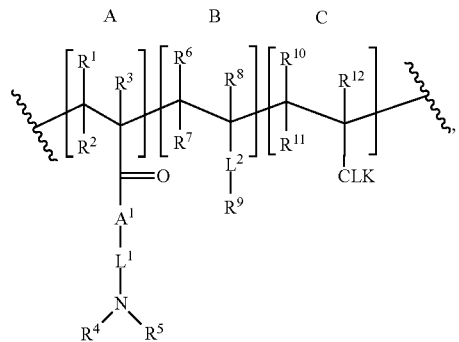

wherein
repeating groups A, B, and C have a random or block copolymer arrangement and are in the order shown or any other order,
at each occurrence, repeating groups A, B, and C independently occur in the direction shown or in the opposite direction, $A^1$ is selected from the group consisting of —O— and —NH—, $R^1$, $R^2$, $R^3$, $R^4$, and $R^5$ are each independently selected from the group consisting of —H, halide, and substituted or unsubstituted $(C_1-C_{50})$hydrocarbyl interrupted by 0, 1, 2, or 3 groups independently selected from —O—, —S—, substituted or unsubstituted —NH—, —($CH_2$—$CH_2$—O)$_{n1}$—, and —($CH_2$—$CH_2$—$CH_2$—O)$_{n1}$—, wherein n1 is about 1 to about 10,000, $L^1$ is substituted or unsubstituted $(C_1-C_{50})$hydrocarbylene interrupted by 0, 1, 2, or 3 groups independently selected from —O—, —S—, substituted or unsubstituted —NH—, —($CH_2$—$CH_2$—O)$_{n2}$—, and —($CH_2$—$CH_2$—$CH_2$—O)$_{n2}$—, wherein n2 is about 1 to about 10,000, $R^6$, $R^7$, $R^8$ are each independently selected from the group consisting of —H, halide, and substituted or unsubstituted $(C_1-C_{50})$hydrocarbyl interrupted by 0, 1, 2, or 3 groups independently selected from —O—, —S—, substituted or unsubstituted —NH—, —($CH_2$—$CH_2$—O)$_{n3}$—, and —($CH_2$—$CH_2$—$CH_2$—O)$_{n3}$—, wherein n3 is about 1 to about 10,000, $L^2$ is selected from the group of a bond and substituted or unsubstituted $(C_1-C_{50})$hydrocarbylene interrupted by 0, 1, 2, or 3 groups independently selected from —O—, —S—, substituted or unsubstituted —NH—, —($CH_2$—$CH_2$—O)$_{n4}$—, and —($CH_2$—$CH_2$—$CH_2$—O)$_{n4}$—, wherein n4 is about 1 to about 10,000, $R^9$ is selected from the group consisting of substituted $(C_1-C_{20})$aryl and substituted or unsubstituted $(C_1-C_{20})$heteroaryl, $R^{10}$, $R^{11}$, and $R^{12}$ are each independently selected from the group consisting of —H, halide, and substituted or unsubstituted $(C_1-C_{50})$hydrocarbyl interrupted by 0, 1, 2, or 3 groups independently selected from —O—, —S—, substituted or unsubstituted —NH—, —($CH_2$—$CH_2$—O)$_{n5}$—, and —($CH_2$—$CH_2$—$CH_2$—O)$_{n5}$—, wherein n5 is about 1 to about 10,000, and CLK is at least one of an intermolecular and an intramolecular crosslink comprising a substituted or unsubstituted $(C_1-C_{50})$hydrocarbylene interrupted by 0, 1, 2, or 3 groups independently selected from —O—, —S—, substituted or unsubstituted —NH—, —($CH_2$—$CH_2$—O)$_{n6}$—, and —($CH_2$—$CH_2$—$CH_2$—O)$_{n6}$—, wherein n6 is about 1 to about 10,000.

Embodiment 79 provides the method of any one of Embodiments 34-78, wherein the polymer comprises repeating groups having the structure:

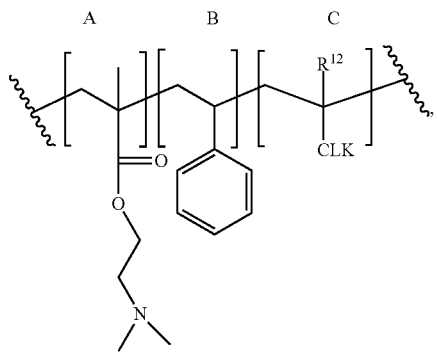

wherein
repeating groups A, B, and C have a random or block copolymer arrangement and are in the order shown or any other order,
at each occurrence, repeating groups A, B, and C independently occur in the direction shown or in the opposite direction,
$R^{12}$ is —H or methyl,
CLK is at least one of an intermolecular and an intramolecular crosslink comprising a substituted or unsubstituted $(C_1$-$C_{50})$hydrocarbylene interrupted by 0, 1, 2, or 3 groups independently selected from —O—, —S—, substituted or unsubstituted —NH—, —$(CH_2$—$CH_2$—$O)_{n6}$—, and —$(CH_2$—$CH_2$—$CH_2$—$O)_{n6}$—, wherein n6 is about 1 to about 10,000.

Embodiment 80 provides the method of any one of Embodiments 34-79, wherein the polymer comprises repeating groups having the structure:

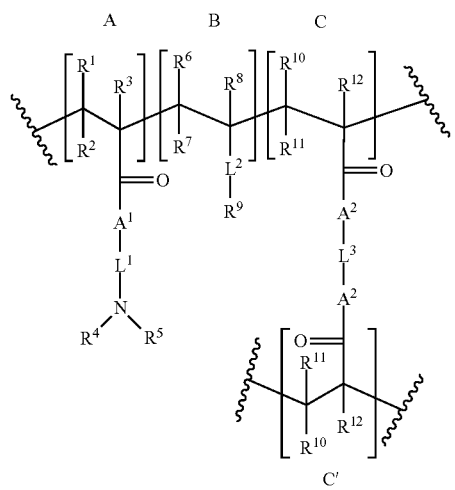

wherein
repeating groups A, B, and C have a random or block copolymer arrangement and are in the order shown or any other order,
at each occurrence, repeating groups A, B, and C independently occur in the direction shown or in the opposite direction,
$A^1$ is selected from the group consisting of —O— and —NH—,
$R^1$, $R^2$, $R^3$, $R^4$, and $R^5$ are each independently selected from the group consisting of —H, halide, and substituted or unsubstituted $(C_1$-$C_{50})$hydrocarbyl interrupted by 0, 1, 2, or 3 groups independently selected from —O—, —S—, substituted or unsubstituted —NH—, —$(CH_2$—$CH_2$—$O)_{n1}$—, and —$(CH_2$—$CH_2$—$CH_2$—$O)_{n1}$—, wherein n1 is about 1 to about 10,000,
$L^1$ is substituted or unsubstituted $(C_1$-$C_{50})$hydrocarbylene interrupted by 0, 1, 2, or 3 groups independently selected from —O—, —S—, substituted or unsubstituted —NH—, —$(CH_2$—$CH_2$—$O)_{n2}$—, and —$(CH_2$—$CH_2$—$CH_2$—$O)_{n2}$—, wherein n2 is about 1 to about 10,000,
$R^6$, $R^7$, $R^8$ are each independently selected from the group consisting of —H, halide, and substituted or unsubstituted $(C_1$-$C_{50})$hydrocarbyl interrupted by 0, 1, 2, or 3 groups independently selected from —O—, —S—, substituted or unsubstituted —NH—, —$(CH_2$—$CH_2$—$O)_{n3}$—, and —$(CH_2$—$CH_2$—$CH_2$—$O)_{n3}$—, wherein n3 is about 1 to about 10,000,
$L^2$ is selected from the group consisting of a bond and substituted or unsubstituted $(C_1$-$C_{50})$hydrocarbylene interrupted by 0, 1, 2, or 3 groups independently selected from —O—, —S—, substituted or unsubstituted —NH—, —$(CH_2$—$CH_2$—$O)_{n4}$—, and —$(CH_2$—$CH_2$—$CH_2$—$O)_{n4}$—, wherein n4 is about 1 to about 10,000,
$R^9$ is selected from the group consisting of substituted $(C_1$-$C_{20})$aryl and substituted or unsubstituted $(C_1$-$C_{20})$heteroaryl,
at each occurrence, $R^{10}$, $R^{11}$, and $R^{12}$ are each independently selected from the group consisting of —H, halide, and substituted or unsubstituted $(C_1$-$C_{50})$hydrocarbyl interrupted by 0, 1, 2, or 3 groups independently selected from —O—, —S—, substituted or unsubstituted —NH—, —$(CH_2$—$CH_2$—$O)_{n5}$—, and —$(CH_2$—$CH_2$—$CH_2$—$O)_{n5}$—, wherein n5 is about 1 to about 10,000,
at each occurrence, $A^2$ is independently selected from the group consisting of —O— and —NH—,
$L^3$ is a substituted or unsubstituted $(C_1$-$C_{48})$hydrocarbylene interrupted by 0, 1, 2, or 3 groups independently selected from —O—, —S—, substituted or unsubstituted —NH—, —$(CH_2$—$CH_2$—$O)_{n7}$—, and —$(CH_2$—$CH_2$—$CH_2$—$O)_{n7}$—, wherein n7 is about 1 to about 10,000, and
repeating group C' is a repeating group C in the same polymer molecule or in a different molecule of the polymer.

Embodiment 81 provides the method of any one of Embodiments 34-80, wherein the polymer comprises repeating groups having the structure:

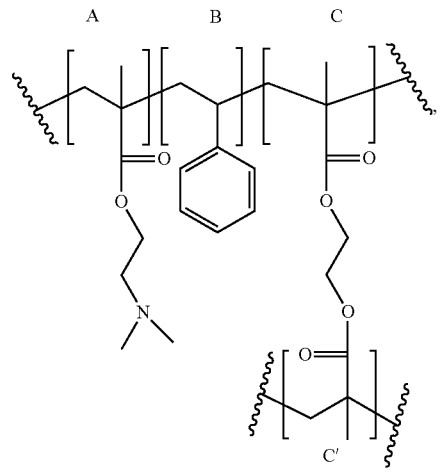

wherein
repeating groups A, B, and C have a random or block copolymer arrangement and are in the order shown or any other order,
at each occurrence, repeating groups A, B, and C independently occur in the direction shown or in the opposite direction,
repeating group C' is a repeating group C in the same polymer molecule or in a different molecule of the polymer.

Embodiment 82 provides the method of any one of Embodiments 1-81, wherein the polymer is N,N-dimethylaminoethyl methacrylate (DMAEMA)-co-styrene-co-ethylene glycol dimethacrylate (EDGMA).

Embodiment 83 provides the method of any one of Embodiments 2-82, further comprising combining the composition with an aqueous or oil-based fluid comprising a stimulation fluid, fracturing fluid, remedial treatment fluid, logging fluid, or a combination thereof, to form a mixture, wherein the placing the composition in the subterranean formation comprises placing the mixture in the subterranean formation.

Embodiment 84 provides the method of any one of Embodiments 2-83, wherein at least one of prior to, during, and after the placing of the composition in the subterranean formation, the composition is used in the subterranean formation, at least one of alone and in combination with other materials, as a stimulation fluid, fracturing fluid, remedial treatment fluid, logging fluid, or a combination thereof.

Embodiment 85 provides the method of any one of Embodiments 2-84, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, graphene, or a combination thereof.

Embodiment 86 provides the method of any one of Embodiments 2-85, wherein the placing of the composition in the subterranean formation comprises pumping the composition through a tubular disposed in a wellbore and into the subterranean formation.

Embodiment 87 provides a system for performing the method of any one of Embodiments 2-86, the system comprising:

a tubular disposed in the subterranean formation; and a pump configured to pump the composition in the subterranean formation through the tubular.

Embodiment 88 provides a method of treating a subterranean formation, the method comprising:

placing in the subterranean formation a proppant comprising a coating thereon, wherein the coating is swellable with aqueous medium in response to a trigger comprising acidic pH, $CO_2$, $H_2S$, or a combination thereof, wherein the coating comprises a polymer comprising repeating groups having the structure:

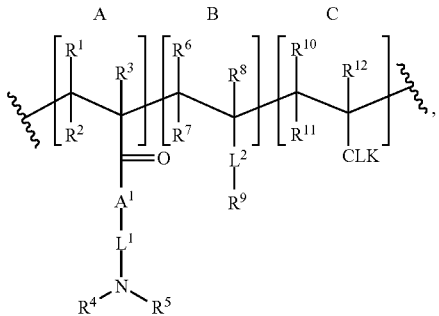

wherein repeating groups A, B, and C have a random or block copolymer arrangement and are in the order shown or any other order, at each occurrence, repeating groups A, B, and C independently occur in the direction shown or in the opposite direction, repeating group A is about 50 mol % to about 98.999 mol % of the polymer, repeating group B is about 1 mol % to about 50 mol % of the polymer, repeating group C is about 0.001 mol % to about 20 mol % of the polymer, $A^1$ is selected from the group consisting of —O— and —NH—, $R^1$, $R^2$, $R^3$, $R^4$, and $R^5$ are each independently selected from the group consisting of —H, halide, and substituted or unsubstituted ($C_1$-$C_{50}$)hydrocarbyl interrupted by 0, 1, 2, or 3 groups independently selected from —O—, —S—, substituted or unsubstituted —NH—, —($CH_2$—$CH_2$—O)$_{n1}$—, and —($CH_2$—$CH_2$—$CH_2$—O)$_{n1}$—, wherein n1 is about 1 to about 10,000, $L^1$ is substituted or unsubstituted ($C_1$-$C_{50}$)hydrocarbylene interrupted by 0, 1, 2, or 3 groups independently selected from —O—, —S—, substituted or unsubstituted —NH—, —($CH_2$—$CH_2$—O)$_{n2}$—, and —($CH_2$—$CH_2$—$CH_2$—O)$_{n2}$—, wherein n2 is about 1 to about 10,000, $R^6$, $R^7$, $R^8$ are each independently selected from the group consisting of —H, halide, and substituted or unsubstituted ($C_1$-$C_{50}$)hydrocarbyl interrupted by 0, 1, 2, or 3 groups independently selected from —O—, —S—, substituted or unsubstituted —NH—, —($CH_2$—$CH_2$—O)$_{n3}$—, and —($CH_2$—$CH_2$—$CH_2$—O)$_{n3}$—, wherein n3 is about 1 to about 10,000, $L^2$ is selected from the group consisting of a bond and substituted or unsubstituted ($C_1$-$C_{50}$)hydrocarbylene interrupted by 0, 1, 2, or 3 groups independently selected from —O—, —S—, substituted or unsubstituted —NH—, —($CH_2$—$CH_2$—O)$_{n4}$—, and —($CH_2$—$CH_2$—$CH_2$—O)$_{n4}$—, wherein n4 is about 1 to about 10,000, $R^9$ is selected from the group consisting of substituted ($C_1$-$C_{20}$)aryl and substituted or unsubstituted ($C_1$-$C_{20}$) heteroaryl, $R^{10}$, $R^{11}$, and $R^{12}$ are each independently selected from the group consisting of —H, halide, and substituted or unsubstituted ($C_1$-$C_{50}$)hydrocarbyl interrupted by 0, 1, 2, or 3 groups independently selected from —O—, —S—, substituted or unsubstituted —NH—, —($CH_2$—$CH_2$—O)$_{n5}$—, and —($CH_2$—$CH_2$—$CH_2$—O)$_{n5}$—, wherein n5 is about 1 to about 10,000, and CLK is at least one of an intermolecular and an intramolecular crosslink comprising a substituted or unsubstituted $(C_1\text{-}C_{50})$hydrocarbylene interrupted by 0, 1, 2, or 3 groups independently selected from —O—, —S—, substituted or unsubstituted —NH—, —$(CH_2-CH_2-O)_{n6}$—, and —$(CH_2-CH_2-CH_2-O)_{n6}$—, wherein n6 is about 1 to about 10,000.

Embodiment 89 provides a system comprising:
a tubular disposed in a subterranean formation; and
a pump configured to pump a composition comprising a proppant comprising a coating thereon in the subterranean formation through the tubular, wherein the coating is swellable with aqueous medium in response to a trigger comprising acidic pH, $CO_2$, $H_2S$, or a combination thereof.

Embodiment 90 provides a proppant for treatment of a subterranean formation, the proppant comprising:
a coating thereon, wherein the coating is swellable with aqueous medium in response to a trigger comprising acidic pH, $CO_2$, $H_2S$, or a combination thereof.

Embodiment 91 provides the proppant of Embodiment 90, wherein a composition comprises the proppant, wherein the composition is a composition for fracturing of a subterranean formation.

Embodiment 92 provides a proppant for treatment of a subterranean formation, the proppant comprising:
a coating thereon, wherein the coating is swellable with aqueous medium in response to a trigger comprising acidic pH, $CO_2$, $H_2S$, or a combination thereof, wherein the coating comprises a polymer comprising repeating groups having the structure:

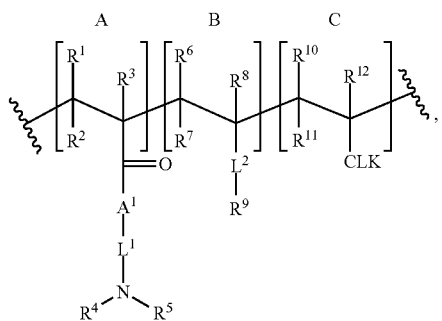

wherein
repeating groups A, B, and C have a random or block copolymer arrangement and are in the order shown or any other order,
at each occurrence, repeating groups A, B, and C independently occur in the direction shown or in the opposite direction,
repeating group A is about 50 mol % to about 98.999 mol % of the polymer,
repeating group B is about 1 mol % to about 50 mol % of the polymer,
repeating group C is about 0.001 mol % to about 20 mol % of the polymer,
$A^1$ is selected from the group consisting of —O— and —NH—,
$R^1$, $R^2$, $R^3$, $R^4$, and $R^5$ are each independently selected from the group consisting of —H, halide, and substituted or unsubstituted $(C_1\text{-}C_{50})$hydrocarbyl interrupted by 0, 1, 2, or 3 groups independently selected from —O—, —S—, substituted or unsubstituted —NH—, —$(CH_2-CH_2-O)_{n1}$—, and —$(CH_2-CH_2-CH_2-O)_{n1}$—, wherein n1 is about 1 to about 10,000,
$L^1$ is substituted or unsubstituted $(C_1\text{-}C_{50})$hydrocarbylene interrupted by 0, 1, 2, or 3 groups independently selected from —O—, —S—, substituted or unsubstituted —NH—, —$(CH_2-CH_2-O)_{n2}$—, and —$(CH_2-CH_2-CH_2-O)_{n2}$—, wherein n2 is about 1 to about 10,000,
$R^6$, $R^7$, $R^8$ are each independently selected from the group consisting of —H, halide, and substituted or unsubstituted $(C_1\text{-}C_{50})$hydrocarbyl interrupted by 0, 1, 2, or 3 groups independently selected from —O—, —S—, substituted or unsubstituted —NH—, —$(CH_2-CH_2-O)_{n3}$—, and —$(CH_2-CH_2-CH_2-O)_{n3}$—, wherein n3 is about 1 to about 10,000,
$L^2$ is selected from the group consisting of a bond and substituted or unsubstituted $(C_1\text{-}C_{50})$hydrocarbylene interrupted by 0, 1, 2, or 3 groups independently selected from —O—, —S—, substituted or unsubstituted —NH—, —$(CH_2-CH_2-O)_{n4}$—, and —$(CH_2-CH_2-CH_2-O)_{n4}$—, wherein n4 is about 1 to about 10,000,
$R^9$ is selected from the group consisting of substituted $(C_1\text{-}C_{20})$aryl and substituted or unsubstituted $(C_1\text{-}C_{20})$heteroaryl,
$R^{10}$, $R^{11}$, and $R^{12}$ are each independently selected from the group consisting of —H, halide, and substituted or unsubstituted $(C_1\text{-}C_{50})$hydrocarbyl interrupted by 0, 1, 2, or 3 groups independently selected from —O—, —S—, substituted or unsubstituted —NH—, —$(CH_2-CH_2-O)_{n5}$—, and —$(CH_2-CH_2-CH_2-O)_{n5}$—, wherein n5 is about 1 to about 10,000, and
CLK is at least one of an intermolecular and an intramolecular crosslink comprising a substituted or unsubstituted $(C_1\text{-}C_{50})$hydrocarbylene interrupted by 0, 1, 2, or 3 groups independently selected from —O—, —S—, substituted or unsubstituted —NH—, —$(CH_2-CH_2-O)_{n6}$—, and —$(CH_2-CH_2-CH_2-O)_{n6}$—, wherein n6 is about 1 to about 10,000.

Embodiment 93 provides a method of preparing a proppant for treatment of a subterranean formation, the method comprising:
coating a proppant with a coating that is swellable with aqueous medium in response to a trigger comprising acidic pH, $CO_2$, $H_2S$, or a combination thereof.

Embodiment 94 provides the method, proppant, composition, or system of any one or any combination of Embodiments 1-93 optionally configured such that all elements or options recited are available to use or select from.

What is claimed is:
1. A method of treating a subterranean formation, comprising:
placing a coated proppant comprising a coating into the subterranean formation, wherein the coating is swellable in contact with an aqueous medium, and wherein the coating is substantially unswollen when placed into the subterranean formation; and
triggering swelling of the coating on the coated proppant within the subterranean formation by exposing the coating to the aqueous medium comprising an acidic pH, $CO_2$, $H_2S$, or any combination thereof;
wherein the coating comprises a polymer that comprises repeating groups having the structure:

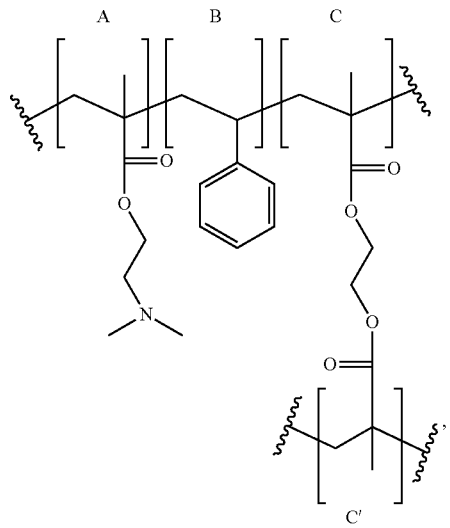

wherein:
- repeating groups A, B, and C have a random or block copolymer arrangement and are in the order shown or any other order;
- at each occurrence, repeating groups A, B, and C independently occur in the direction shown or in the opposite direction;
- repeating group C' is a repeating group C in the same polymer molecule or in a different molecule of the polymer;
- the repeating group A is about 60 mol % to about 95 mol % of the polymer;
- the repeating group B is about 5 mol % to about 40 mol % of the polymer; and
- the repeating group C is about 0.001 mol % to about 10 mol % of the polymer.

2. A system for performing the method of claim 1, the system comprising:
- a tubular disposed in the subterranean formation; and
- a pump configured to pump the composition in the subterranean formation through the tubular.

3. The method of claim 1, wherein after the triggering and the swelling of the coating, the coated proppant has a greater buoyancy than the coated proppant having the coating that is substantially unswollen.

4. A method of treating a subterranean formation, comprising:
- placing a coated proppant comprising a coating into the subterranean formation, wherein the coating is swellable in contact with an aqueous medium, and wherein the coating is substantially unswollen when placed into the subterranean formation; and
- triggering swelling of the coating on the coated proppant within the subterranean formation by exposing the coating to the aqueous medium comprising an acidic pH, $CO_2$, $H_2S$, or any combination thereof;
- wherein the coating comprises a polymer comprising repeating groups having the structure:

wherein:
- repeating groups A, B, and C have a random or block copolymer arrangement and are in the order shown or any other order,
- at each occurrence, repeating groups A, B, and C independently occur in the direction shown or in the opposite direction,
- repeating group A is about 50 mol % to about 98.999 mol % of the polymer,
- repeating group B is 1 mol % to about 50 mol % of the polymer,
- repeating group C is about 0.001 mol % to about 20 mol % of the polymer,
- $A^1$ is selected from the group consisting of —O— and —NH—,
- $R^1$, $R^2$, $R^3$, $R^4$, and $R^5$ are each independently selected from the group consisting of —H, halide, and substituted or unsubstituted $(C_1\text{-}C_{50})$hydrocarbyl interrupted by 0, 1, 2, or 3 groups independently selected from —O—, —S—, substituted or unsubstituted —NH—, —$(CH_2—CH_2—O)_{n1}$—, and —$(CH_2—CH_2—CH_2—O)_{n1}$—, wherein n1 is 1 to about 10,000,
- $L^1$ is substituted or unsubstituted $(C_1\text{-}C_{50})$hydrocarbylene interrupted by 0, 1, 2, or 3 groups independently selected from —O—, —S—, substituted or unsubstituted —NH—, —$(CH_2—CH_2—O)_{n2}$—, and —$(CH_2—CH_2—CH_2—O)_{n2}$—, wherein n2 is 1 to about 10,000,
- $R^6$, $R^7$, $R^8$ are each independently selected from the group consisting of —H, halide, and substituted or unsubstituted $(C_1\text{-}C_{50})$hydrocarbyl interrupted by 0, 1, 2, or 3 groups independently selected from —O—, —S—, substituted or unsubstituted —NH—, —$(CH_2—CH_2—O)_{n3}$—, and —$(CH_2—CH_2—CH_2—O)_{n3}$—, wherein n3 is 1 to about 10,000,
- $L^2$ is selected from the group consisting of a bond and substituted or unsubstituted $(C_1\text{-}C_{50})$hydrocarbylene interrupted by 0, 1, 2, or 3 groups independently selected from —O—, —S—, substituted or unsubstituted —NH—, —$(CH_2—CH_2—O)_{n4}$—, and —$(CH_2—CH_2—CH_2—O)_{n4}$—, wherein n4 is 1 to about 10,000,
- $R^9$ is selected from the group consisting of substituted $(C_1\text{-}C_{20})$aryl and substituted or unsubstituted $(C_1\text{-}C_{20})$heteroaryl,
- $R^{10}$, $R^{11}$ and $R^{12}$ are each independently selected from the group consisting of —H, halide, and substituted or unsubstituted $(C_1\text{-}C_{50})$hydrocarbyl interrupted by 0, 1, 2, or 3 groups independently selected from —O—, —S—, substituted or unsubstituted —NH—, —(CH$_2$—CH$_2$—O)$_{n5}$—, and —(CH$_2$—CH$_2$—CH$_2$—O)$_{n5}$—, wherein n5 is 1 to about 10,000, and CLK is at least one of an intermolecular and an intramolecular crosslink comprising a substituted or unsubstituted (C$_1$-C$_{50}$)hydrocarbylene interrupted by 0, 1, 2, or 3 groups independently selected from —O—, —S—, substituted or unsubstituted —NH—, —(CH$_2$—CH$_2$—O)$_{n6}$—, and —(CH$_2$—CH$_2$—CH$_2$—O)$_{n6}$—, wherein n6 is 1 to about 10,000.

* * * * *